US012695484B1

(12) United States Patent
Nasir

(10) Patent No.: US 12,695,484 B1
(45) Date of Patent: Jul. 28, 2026

(54) MAX-MIN SECURE ENERGY EFFICIENCY OPTIMIZATION FOR SIMULTANEOUS TRANSMITTING AND REFLECTING (STAR)-REFLECTIVE INTELLIGENT SURFACE (RIS)-ASSISTED NEAR-FIELD WIDEBAND TERAHERTZ (THz) COMMUNICATION

(71) Applicant: KING FAHD UNIVERSITY OF PETROLEUM AND MINERALS, Dhahran (SA)

(72) Inventor: Ali Arshad Nasir, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/370,619

(22) Filed: Oct. 27, 2025

(51) Int. Cl.
  *H04B 7/04* (2017.01)
  *H04B 7/0426* (2017.01)
  *H04B 7/06* (2006.01)

(52) U.S. Cl.
  CPC ....... *H04B 7/04013* (2023.05); *H04B 7/0426* (2013.01); *H04B 7/0617* (2013.01)

(58) Field of Classification Search
  CPC .............. H04B 7/04013; H04B 7/0426; H04B 7/0617; H04B 7/145
  See application file for complete search history.

(56) References Cited

FOREIGN PATENT DOCUMENTS

| CN | 119095078 A | 12/2024 |
| ID | 202503975 A | 3/2025 |

OTHER PUBLICATIONS

Z. Wang, X. Mu, J. Xu and Y. Liu, "Simultaneously Transmitting and Reflecting Surface (STARS) for Terahertz Communications," in IEEE Journal of Selected Topics in Signal Processing, vol. 17, No. 4, pp. 861-877, Jul. 2023. (Year: 2023).*

(Continued)

*Primary Examiner* — Sophia Vlahos
(74) *Attorney, Agent, or Firm* — Oblon, McClelland, Maier & Neustadt, L.L.P.

(57) ABSTRACT

A method for maximizing a minimum secure energy efficiency (EE) in a simultaneous transmitting and reflecting (STAR) reconfigurable intelligent surface (RIS)-assisted near-field orthogonal frequency division multiplexing (OFDM)-based wideband terahertz (THz) communication system. The system includes an M-antenna base station (BS) employing a true time delay (TTD)-based hybrid beamforming structure, a STAR-RIS with N reflective elements arranged in a uniform planar array (UPA), U single-antenna user equipment (UEs), and E single-antenna eavesdroppers (EVs), with UEs and EVs positioned on reflection and transmission sides of the STAR-RIS, respectively. The method includes maximizing the minimum secure EE subject to constraints on total transmit power, unit-modulus analog beamforming, STAR-RIS energy conservation, and TTD time-delay limits. The method further includes controlling the BS, digital baseband processing, each RF chain, each TTD, each phase shifter (PS), the STAR-RIS, and circuitry of each UE to operate in accordance with the maximized minimum secure EE.

20 Claims, 11 Drawing Sheets

(56) References Cited

OTHER PUBLICATIONS

W. Wang, W. Ni, H. Tian, Z. Yang, C. Huang and K. -K. Wong, "Safeguarding NOMA Networks via Reconfigurable Dual-Functional Surface Under Imperfect CSI," in IEEE Journal of Selected Topics in Signal Processing, vol. 16, No. 5, pp. 950-966, Aug. 2022. (Year: 2022).*

X. Hu et al., "Securing Near-Field Wideband MIMO Communications via True-Time Delayer-Based Hybrid Beamfocusing," in IEEE Transactions on Wireless Communications, vol. 23, No. 10, pp. 13562-13578, Oct. 2024. (Year: 2024).*

X. Mu, J. Xu, Z. Wang and N. Al-Dhahir, "Simultaneously Transmitting and Reflecting Surfaces for Ubiquitous Next-Generation Multiple Access in 6G and Beyond," in Proceedings of the IEEE, vol. 112, No. 9, pp. 1346-1371, Sep. 2024 (Year: 2024).*

Yunpu Zhang, Yuan Fang, Changsheng You, Ying-Jun Angela Zhang, and Hing Cheung So, "Performance Analysis and Low-Complexity Beamforming Design for Near-Field Physical Layer Security", arXiv:2407.13491, pp. 1-13.Apr. 2025. (Year: 2025).*

Jingjing Zhao, et al., "Simultaneously Transmitting and Reflecting Reconfigurable Intelligent Surface (STAR-RIS) Assisted UAV Communications", IEEE Journal on Selected Areas in Communications, vol. 40, Issue 10, Oct. 2022, pp. 3041-3056, . 16 pages.

Xinwei Yue, et al., "Simultaneously Transmitting and Reflecting Reconfigurable Intelligent Surface Assisted NOMA Networks", IEEE Transactions on Wireless Communications, vol. 22, Issue 1, Jan. 2023, pp. 189-204, 16 pages.

* cited by examiner

1200

MAX-MIN SECURE ENERGY EFFICIENCY OPTIMIZATION FOR SIMULTANEOUS TRANSMITTING AND REFLECTING (STAR)-REFLECTIVE INTELLIGENT SURFACE (RIS)-ASSISTED NEAR-FIELD WIDEBAND TERAHERTZ (THz) COMMUNICATION

STATEMENT OF PRIOR DISCLOSURE BY AN INVENTOR

Aspects of the present disclosure are described in A. A. Nasir, "Max-Min Secure Energy Efficiency Optimization for STAR-RIS-Assisted Near-Field Wideband THz Communication," in *IEEE Transactions on Green Communications and Networking* (2025) which is incorporated herein by reference in its entirety.

STATEMENT OF ACKNOWLEDGEMENT

Supported provided by the Deanship of Research Oversight and Coordination (DROC) at King Fahd University of Petroleum and Minerals (KFUPM) under the Interdisciplinary Research Center for Communication Systems and Sensing through project No. INCS2511 is gratefully acknowledged.

BACKGROUND

Technical Field

The present disclosure relates to terahertz (THz) communication systems, and, in particular, to hybrid beamforming in near-field wideband THz networks assisted by simultaneous transmitting and reflecting reconfigurable intelligent surfaces (STAR-RIS).

Description of Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Next-generation sixth generation (6G) wireless communication systems are expected to enable ultra-reliable and ultra-high-speed data transmissions that cater to a diverse range of advanced applications, such as extended reality, industrial automation, autonomous mobility, and massive machine-type communications. Achieving these performance targets necessitates substantial enhancement in peak data rates, beyond what current 5G systems can offer. One promising approach to meeting this condition is to exploit the terahertz (THz) frequency band, typically ranging from 0.1 to 10 THz, which offers access to several tens of gigahertz of underutilized spectrum. Unlike the 5G spectrum, which operates primarily below 6 GHz with channel bandwidths around 100 MHz, THz frequencies can provide extremely large bandwidths and consequently enable significantly higher data rates.

However, the adoption of THz frequencies introduces several fundamental challenges, chief among them being the severe path loss incurred due to molecular absorption and scattering, particularly from oxygen and water vapor. These attenuation effects necessitate the deployment of advanced antenna technologies capable of compensating for such losses. In particular, large-scale multiple-input multiple-output (MIMO) antenna arrays are employed to focus transmitted energy into narrow directional beams, thereby improving received signal strength and enhancing coverage. MIMO technology, in general, refers to the use of multiple transmitting and receiving antennas to exploit spatial diversity and multiplexing gains in wireless systems. In massive MIMO systems, the number of antennas at the transmitter and/or receiver can reach hundreds, enabling fine-grained spatial beamforming and high spectral efficiency.

To improve signal robustness and extend coverage in the presence of obstacles or non-line-of-sight (NLoS) conditions, reconfigurable intelligent surfaces (RIS) have been introduced. RIS are planar electromagnetic surfaces comprising a grid of passive or nearly passive elements whose reflection characteristics—typically phase and/or amplitude—can be dynamically reconfigured via embedded control circuitry. These surfaces can reflect incident electromagnetic waves in desired directions without generating their own signals, thus enabling the manipulation of wireless propagation environments to support better signal quality. However, conventional RIS architectures can only reflect signals to one side of the surface and are inherently incapable of simultaneously serving users located on opposite sides. This limitation restricts the spatial coverage of conventional RIS-based systems and constrains their utility in full-space deployment scenarios.

To address this, the concept of simultaneous transmitting and reflecting RIS (STAR-RIS) has recently emerged. STAR-RIS are engineered to simultaneously transmit and reflect incident signals, allowing for 360-degree, or full-space, signal coverage. The transmitted and reflected wavefronts are independently controllable via adjustable transmission and reflection coefficients, both in phase and amplitude. STAR-RIS thereby overcomes the inherent coverage limitations of traditional RIS, making them particularly attractive for deployment in highly dynamic or obstructed environments, such as urban microcells or factory floors with mobile autonomous systems.

Further, as THz systems increasingly rely on large-scale antenna arrays and RIS-based reconfigurations, the operating regime shifts from far-field to near-field propagation. The near-field region is characterized by electromagnetic wavefronts that exhibit spherical behavior due to the proximity between the transmitting and receiving arrays. The boundary between near-field and far-field zones is typically defined by the Rayleigh distance, which scales quadratically with the aperture size of the transmitting antenna array and inversely with the wavelength of the carrier signal. In 6G THz systems with large array apertures and short transmission distances, this Rayleigh distance becomes sufficiently large that both base station (BS) to RIS and RIS to user equipment (UE) transmissions occur in the near-field domain. Consequently, planar wave models commonly used in far-field analyses become inadequate, and spherical wavefront modeling may be adopted to accurately describe electromagnetic propagation.

To reduce the hardware cost associated with massive MIMO systems operating at THz frequencies, hybrid beamforming has been proposed as a practical solution. Hybrid beamforming refers to a two-stage beamforming architecture in which digital beamforming is performed at the baseband level using a limited number of RF chains, while analog beamforming is realized using phase shifters or true time delay (TTD) units connected to the antenna elements.

This approach allows for high-dimensional beamforming while minimizing the number of high-cost RF components. However, in wideband systems, conventional phase shifter-based analog beamformers suffer from the beam-splitting effect, wherein the main lobe of the beam shifts with frequency, leading to misalignment and reduced gain across subcarriers.

To mitigate this, true time delay units are used instead of phase shifters to implement frequency-dependent analog beamforming, enabling consistent beam direction across subcarriers. When hybrid beamforming with TTD is used at the BS, and the STAR-RIS is deployed along the signal path, a double beam-splitting effect can occur due to the frequency sensitivity of both the BS and STAR-RIS components. While implementing TTDs at the STAR-RIS could, in theory, alleviate this effect, recent analyses have shown that the array gain remains stable across subcarriers for smaller RIS dimensions, allowing the omission of TTDs at the STAR-RIS to simplify system design.

Notwithstanding these architectural optimizations, large-scale antenna arrays and TTD-enabled hybrid beamforming introduce significant energy consumption overheads. Energy efficiency (EE), formally defined as the ratio of achievable spectral efficiency to total power consumption, has therefore emerged as a critical performance metric in STAR-RIS-assisted THz communication systems. Maximizing EE can be achieved by careful balancing of transmission power, hardware constraints, and beamforming strategies. Moreover, the deployment of STAR-RIS inherently introduces additional signal paths, which—while enhancing coverage—also increase the exposure of transmitted signals to potential eavesdroppers. Thus, STAR-RIS systems are particularly susceptible to signal interception attacks, raising urgent concerns regarding physical layer security (PLS).

Several prior studies have examined the joint design of hybrid beamforming and RIS optimization for wideband THz systems. For instance, a few methods focus on sum-rate maximization in multi-user scenarios. A plurality of methods examines EE performance under hybrid beamforming configurations. In a few methods, STAR-RIS and hybrid beamforming are incorporated in an energy-efficient optimization framework. This work proposes a TTD-based design with constraints on unit-modulus beamforming, power budgets, and energy conservation in the STAR-RIS, acknowledging the physical limitations imposed by energy-splitting operation, where each STAR-RIS element splits incident energy between reflected and transmitted paths according to defined ratios. Nevertheless, such an approach does not account for quality-of-service (QoS) fairness or the maximization of minimum user EE under secure communication requirements.

A max-min EE optimization strategy was introduced for STAR-RIS-assisted communication to ensure QoS fairness across users. However, it does not address the unique challenges of wideband THz propagation, nor does it consider physical layer security. Consequently, none of the aforementioned references comprehensively tackle the problem of joint hybrid beamforming and STAR-RIS optimization for secure EE maximization in wideband THz systems.

In the domain of physical layer security, a few methods have investigated joint transmit beamforming and STAR-RIS optimization under eavesdropping scenarios. These studies primarily target sum secure rate or max-min secure rate maximization. While they account for the presence of eavesdroppers (EVs), they do not incorporate wideband THz modeling, nor do they seek to maximize secure EE. Additionally, they assume a limited number of EVs on a single side of the STAR-RIS, ignoring the practical possibility of EVs being present on both the transmission and reflection sides. A few methods consider sum secrecy rate optimization but similarly overlook the presence of multiple EVs and wideband frequency selectivity.

Furthermore, CN119095078A discloses an IRS-assisted NOMA uplink transmission method that maximizes EE via a block coordinate descent approach. This reference addresses phase shift optimization and transmit power control but does not explore STAR-RIS-based transmission, nor does it address physical layer security or wideband propagation. Likewise, ID202503975A provides control mechanisms for RIS operation and transmission configuration indicators (TCIs) but remains confined to signaling and control logic without addressing system-level EE or secure transmission strategies.

Accordingly, a gap remains in the literature concerning the design of STAR-RIS-assisted near-field wideband THz communication systems that jointly optimize hybrid beamforming and STAR-RIS parameters for secure and energy-efficient operation. In particular, there is a need for a solution that accounts for multiple user equipment and multiple eavesdroppers located on both sides of the STAR-RIS, considers the constraints imposed by energy-splitting architecture and true time delay hardware, and enables max-min secure energy efficiency optimization across users under realistic propagation and power constraints. Addressing these challenges is critical to the advancement of robust, energy-conscious, and secure THz wireless networks for 6G deployments.

SUMMARY

In an exemplary embodiment, a method for maximizing a minimum secure energy efficiency in a near-field, wideband terahertz (THz) communication system is disclosed. The method comprises: generating, at a base station, a plurality of wideband THz signals using a hybrid analog-digital beamforming architecture that includes a plurality of radio-frequency (RF) chains, phase shifters (PS), and a plurality of true time delay (TTD) units; and applying, by the plurality of TTD units, respective time delays to compensate for beam-splitting effects across a plurality of subcarriers. The method further comprises configuring, by a simultaneous transmitting and reflecting reconfigurable intelligent surface (STAR-RIS) comprising N elements, a set of phase-shifts and amplitude coefficients for each element of the STAR-RIS to simultaneously transmit and reflect the THz signals toward a plurality of user equipment (UEs) on both sides of the STAR-RIS; and determining, by a processor, a secrecy rate for each UE as a difference between an achievable rate of the UE and an intercept rate of an eavesdropper (EV). The method them optimizes a plurality of optimization variables including: digital beamforming $$(W_k^D),$$

PS-based analog beamforming ($W^{PS}$), matrices of the TTD units $[\![ (D) ]\!]_k$), and transmission and reflection coefficients of the STAR-RIS ($\theta_t$ and $\theta_r$) to maximize a minimum secure energy efficiency among all UEs.

In another exemplary embodiment, a system for maximizing a minimum secure energy efficiency in a near-field, wideband terahertz (THz) communication system is disclosed. The system comprises: a base station, a simultaneous transmitting and reflecting reconfigurable intelligent surface (STAR-RIS) comprising N elements, and, a processor. The processor is configured to: generate, at a base station, a plurality of wideband THz signals using a hybrid analog-digital beamforming architecture that includes a plurality of radio-frequency (RF) chains, phase shifters (PS), and the plurality of TTD units, and apply, via the plurality of TTD units, respective time delays to compensate for beam-splitting effects across a plurality of subcarriers. The processor is further configured to configure, via the STAR-RIS, a set of phase-shifts and amplitude coefficients for each element of the STAR-RIS to simultaneously transmit and reflect the THz signals toward a plurality of user equipment (UEs) on both sides of the STAR-RIS, and determine, a secrecy rate for each UE as a difference between an achievable rate of the UE and an intercept rate of an eavesdropper (EV). The processor further optimizes a plurality of optimization variables including: digital beamforming $$\left(W_k^D\right),$$

PS-based analog beamforming ($W^{PS}$), matrices of the TTD units $\left[ \left(D\right]_k\right)$, and transmission and reflection coefficients of the STAR-RIS ($\theta_t$ and $\theta_r$) to maximize a minimum secure energy efficiency among all UEs.

In another exemplary embodiment, the foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
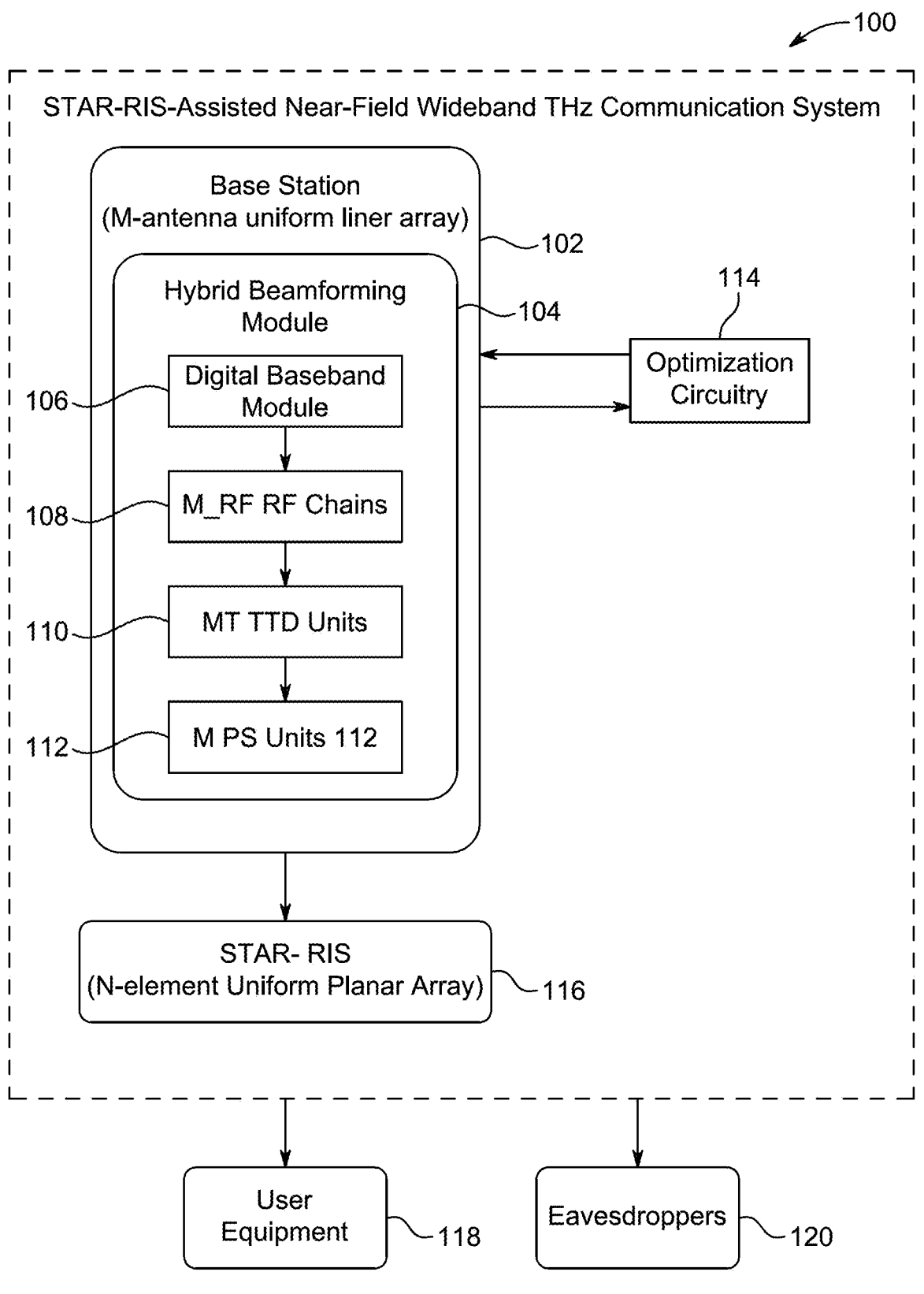
FIG. 1A is a schematic diagram illustrating a STAR-RIS-assisted near-field wideband THz communication system according to some embodiments of the present disclosure.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

The present disclosure relates to a STAR-RIS-assisted near-field wideband THz communication system comprising a base station, a STAR-RIS, a plurality of user equipment (UEs), and a plurality of eavesdroppers (EVs). The disclosure addresses the technical challenge of maximizing the minimum secure energy efficiency under practical constraints, including transmit power budget, unit-modulus analog beamforming, energy conservation at the STAR-RIS, and time-delay limits of true-time delay units.

To address the non-convexity of the fractional objective function and coupling among variables, a penalty dual decomposition-based method is employed, incorporating a block coordinate descent approach within the inner loop and dual variable updates in the outer loop. Simulation results demonstrate enhanced secure energy efficiency over conventional fully-digital beamforming, hybrid beamforming, and RIS-assisted methods, while accommodating multiple UEs and EVs in the near-field THz environment.

FIG. 1A illustrates a system architecture for secure and energy-efficient wideband terahertz (THz) communication under near-field propagation, according to one embodiment.

In one embodiment, the system includes a base station 102 comprising an M-antenna uniform linear array (ULA), a hybrid beamforming module 104, and associated subsystems configured to support secure and energy-efficient wideband THz transmission under near-field communication constraints. The base station 102 may be implemented as a terrestrial THz access point, a fixed wireless terminal, or an integrated gNodeB (gNB) in a next-generation wireless infrastructure. The base station 102 is configured to operate in the THz frequency band, which supports ultra-wide bandwidths but exhibits high path loss, thus necessitating precise beamforming and directional signal delivery. In various configurations, the base station 102 may be mounted on urban infrastructure, indoor ceilings, or autonomous platforms including aerial base stations.

The base station 102 includes an M-antenna uniform linear array (ULA), physically implemented as a one-dimensional linear array of M antenna elements, uniformly spaced to form a coherent aperture. The ULA is configured to facilitate spatial beamforming, direction-of-arrival estimation, and spatial multiplexing over narrow and wide angular domains. Each antenna element in the ULA may be implemented as a high-frequency THz patch antenna, a planar slot array, or a photonic integrated antenna, depending on the packaging and integration demands of the base station 102. The M-antenna ULA enables high-resolution directional control over transmitted THz beams, and when operating under near-field conditions, accounts for spherical wavefronts rather than conventional far-field approximations.

The base station 102 further comprises a hybrid beamforming module 104, configured with a true time delay (TTD)-based hybrid beamforming structure. The hybrid beamforming module 104 implements a combination of digital and analog beamforming operations, rendering for flexible, low-complexity, and power-efficient control over THz signals in both the frequency and spatial domains.

In the first stage, digital beamforming is performed within the digital baseband module 106, wherein a plurality of user data streams are processed to apply subcarrier-specific complex weights across multiple orthogonal frequency division multiplexing (OFDM) subcarriers. This digital beamforming stage facilitates frequency-selective control, adaptive precoding, and dynamic power allocation based on real-time channel state information (CSI) acquired from the communication environment. The digitally precoded signals are subsequently mapped onto a reduced set of $M_{RF}$ radio frequency (RF) chains 108, thereby minimizing hardware resource consumption while maintaining spatial diversity.

In the second stage, analog beamforming is implemented across the RF front-end using a cascaded architecture comprising a matrix of true time delay (TTD) units 110 and a corresponding array of phase shifter (PS) units 112. The TTD units 110 are configured to introduce frequency-dependent delay compensation to mitigate beam squint effects prevalent in wideband terahertz (THz) channels, whereas the PS units 112 are configured to align signal phases across the antenna aperture. This two-stage configuration, described further in subsequent description, enables simultaneous control over the frequency and spatial domains, thereby achieving energy-efficient, low-complexity, and directionally adaptive beamforming suitable for secure, high-capacity THz communication in STAR-RIS-assisted wireless systems.

The digital baseband module 106 is configured to execute a plurality of baseband-level signal processing functions essential for the operation of high-frequency wideband communication systems. In particular, the digital baseband module 106 performs subcarrier modulation, channel estimation, adaptive precoding, and power allocation across multiple orthogonal frequency division multiplexing (OFDM) subcarriers. The use of OFDM, a multicarrier transmission scheme wherein the channel bandwidth is divided into a plurality of orthogonal subcarriers, enables the system to combat frequency-selective fading and enhances spectral efficiency in terahertz (THz) wideband transmission environments. Each subcarrier within the OFDM structure can be modulated independently, allowing precise allocation of transmission resources in response to channel variations and user-specific requirements.

The digital baseband module 106 supports the OFDM-based transmission framework employed by the base station and jointly optimizes beamforming and power distribution across the frequency-dependent subcarriers. The module 106 facilitates modulation techniques such as quadrature amplitude modulation (QAM) or phase shift keying (PSK) per subcarrier, and executes channel estimation procedures using pilot signals to retrieve accurate channel state information (CSI). CSI refers to real-time, dynamically estimated parameters that characterize the properties of the wireless communication channel between the base station and one or more user equipment (UE). The digital baseband module 106 is configured to acquire CSI through pilot-based feedback or estimation techniques, and to utilize the acquired CSI for optimizing transmission strategies across orthogonal frequency division multiplexing (OFDM) subcarriers. CSI enables adaptive digital beamforming, channel-aware precoding, and intelligent power allocation, thereby facilitating spatial multiplexing and interference mitigation in multiuser environments. CSI is acquired, in the present embodiment, for configuring hybrid beamforming across the base station and the STAR-RIS 116, enabling the optimization circuitry 114 to maximize secure energy efficiency (EE) by dynamically aligning beams with respect to varying channel conditions and user positions, while maintaining robustness against channel distortions and frequency selectivity inherent in the THz band.

The digital baseband module 106 may be implemented using digital signal processors (DSPs), which provide high-speed arithmetic operations for real-time modulation and filtering tasks. Alternatively, the digital baseband module 106 may be realized using a system-on-chip (SoC) platform that integrates multiple processing elements, including embedded CPUs and digital baseband engines, or through reconfigurable logic devices such as field-programmable gate arrays (FPGAs), which enable hardware-level customization of signal processing pipelines. Such implementations allow the digital baseband module 106 to accommodate the dynamic demands of massive multi-user OFDM systems, where simultaneous data streams for multiple user equipment (UEs) must be spatially and spectrally multiplexed.

The digital outputs generated by the digital baseband module 106 are then routed to $M_{RF}$ RF chains 108, which are configured to perform digital-to-analog conversion, frequency up-conversion to THz carrier frequencies, and signal amplification. Specifically, each RF chain 108 performs a digital-to-analog conversion operation on the digital output received from the digital baseband module 106 to transform the digital baseband signal into an analog signal. Following conversion, each the RF chain 108 then executes a frequency up conversion operation, wherein the baseband analog signal is translated to a corresponding carrier frequency situated in the terahertz (THz) spectrum, typically utilizing a local oscillator and mixer circuitry. Thereafter, an amplification stage is applied to boost the power level of the upconverted signal to achieve adequate transmission power for propagation across the wireless medium.

M represents the total number of antennas in the uniform linear array (ULA) at the base station. $M_{RF}$ denotes the number of radio frequency (RF) chains implemented in the hybrid beamforming architecture. The number $M_{RF}$ is typically less than M, enabling the system to reduce hardware complexity while retaining beamforming flexibility through partial digital beamforming.

Each of the $M_{RF}$ RF chains 108 is coupled to the $M_T$ TTD units 110. The $M_T$ TTD units 110 are configured to apply analog time delays to the RF signal output by each RF chain 108 compensate for frequency-dependent phase shifts, thereby beamforming without squint over wide bandwidths. The $M_T$ TTD units 110 may be implemented using optical delay lines, microelectromechanical systems (MEMS)-based switched delay circuits, or programmable transmission line networks, and may be digitally controlled to achieve precise delay tuning per antenna element.

The delayed outputs of the TTD units 110 are then fed to M PS units 112. Each M PS unit 112 is configured to apply analog phase shifts to enable fine-grained spatial beam control. The PS units 112 may be realized using varactor-based or ferroelectric phase shifters suitable for THz operation, and can be tuned dynamically in coordination with the digital beamforming outputs and TTD configurations.

The combined operation of the digital baseband module 106, the $M_{RF}$ RF chains 108, the MT TTD units 110, and the M PS units 112 enables hybrid analog-digital beamforming with both frequency-flat and frequency-dependent compensation, thereby facilitating high-performance OFDM-based transmission across the THz band under near-field propagation scenarios. The output of the hybrid beamforming module 104 is subsequently coupled to a STAR-reconfigurable intelligent surface (STAR-RIS) 116 for reflective and transmissive wavefront modulation in accordance with the system objective of secure and energy-efficient THz communication.

The STAR-RIS 116 is configured to perform simultaneous transmitting and reflecting operations. Thereby, the STAR-RIS 116 is capable of concurrently redirecting a portion of the incident THz signal in two physically distinct directions, such as a transmission direction and a reflection direction. This dual-functionality is realized through the physical and electromagnetic design of the STAR-RIS elements, which are engineered to split the incoming signal energy into transmitted and reflected components based on a pre-determined or dynamically optimized energy-splitting protocol.

In more technical terms, simultaneous transmitting and reflecting refers to the capacity of each STAR-RIS unit cell to independently control the amplitude and phase of both the reflected and transmitted waves. For example, an impinging wideband THz waveform arriving at the STAR-RIS surface is partitioned such that a portion of its energy is transmitted through the STAR-RIS to serve user equipment (UEs) 118, while the remaining energy is reflected back toward a different spatial region, which may be deliberately misaligned with the positions of potential eavesdroppers (EVs) 120 to minimize signal leakage.

The operation differs from conventional reconfigurable intelligent surfaces (RIS), which typically support only reflection, or transmissive metasurfaces, which support only transmission. In contrast, the STAR-RIS 116 provides a full-space coverage capability, meaning that it can simultaneously serve UEs 118 located on the transmission side, while also manipulating the reflected wavefront to introduce security-enhancing distortions, interference, or nulls in the direction of EVs 120 located on the reflection side.

The user equipment (UE) 118 represents a set of U single-antenna terminals, each positioned on the transmission side of the STAR-RIS 116 within a near-field region relative to both the STAR-RIS 116 and the base station 102. Each UE 118 is configured to receive OFDM-based wideband THz signals that have been directionally transmitted via the hybrid beamforming path through the STAR-RIS 116. The transmission profile of the STAR-RIS 116 is dynamically adjusted to direct focused energy beams toward the known spatial positions of each UE 118, thereby maximizing directional gain, spectral efficiency, and secure energy delivery.

In one exemplary configuration, each UE 118 comprises a THz-capable antenna module fabricated using sub-millimeter wave materials, such as indium phosphide or graphene-based conductors. The UE 118 further includes a demodulation baseband engine capable of decoding high-throughput OFDM signals, a low-noise amplifier for front-end signal acquisition, and a secure decryption module for recovering user data under an encrypted communication framework. The UEs 118 may include, but are not limited to, mobile handsets, tablets, wearable computing devices, virtual reality (VR) headsets, biomedical sensors, autonomous vehicle terminals, and machine-type communication (MTC) nodes, each operating in compliance with THz communication standards.

Illustratively, in a smart factory deployment, a UE 118 may refer to a mobile inspection robot equipped with a THz receiver, requiring low-latency, high-throughput wireless links for real-time video transmission. In another embodiment, a UE 118 may be implemented as a body-worn health monitor transmitting vital signs to a remote server via STAR-RIS-assisted THz relays. In such configurations, the STAR-RIS 116 allocates a larger portion of its transmissive energy toward regions where these UEs 118 are physically located, while suppressing signal leakage toward untrusted areas.

The eavesdroppers (EVs) 120 are modeled as a set of E single-antenna passive adversarial terminals, positioned on the reflection side of the STAR-RIS 116. Each EV 120 attempts to intercept THz signals reflected off the STAR-RIS 116 in order to compromise the confidentiality and energy integrity of legitimate transmissions. These eavesdroppers 120 may reside within the physical vicinity of legitimate users or within adversarial-controlled zones and are assumed to possess knowledge of transmission protocols and frequency bands. However, they lack access to legitimate decryption keys and baseband synchronization metadata.

In one embodiment, the EV 120 may comprise a software-defined radio (SDR) platform equipped with a THz-band receiver and programmable demodulator, configured to scan the spatial spectrum for beam leakage or reflected energy patterns. In another embodiment, the EV 120 may be realized as a malicious IoT node or a rogue unmanned aerial vehicle (UAV) equipped with directional THz antennas. The system architecture illustrated in FIG. 1A addresses such threats by adaptively configuring the reflective profile of the STAR-RIS 116 to introduce artificial noise, beam misalignment, or phase decorrelation in the reflective channel paths corresponding to the EVs 120.

The presence of EVs 120 necessitates the joint design of beamforming vectors at the hybrid beamforming module 104 and the spatial reflection-transmission map of the STAR-RIS 116. By carefully manipulating the analog phase profiles and delay spreads, the system seeks to maximize the minimum secure energy efficiency (EE) across all UEs 118 while minimizing information and energy leakage to the EVs 120, all under strict constraints of power, unit-modulus beamforming, energy conservation, and physical time delay.

The overall operation of the base station 102, including the digital baseband module 106, the MRF RF chains 108, the MT TTD units 110, the M PS units 112, and the STAR-RIS 116, is coordinated through an optimization circuitry 114. The optimization circuitry 114 is configured to control the base station 102, including the digital baseband module 106, the MRF RF chains 108, the MT TTD units 110, the M PS units 112, and the STAR-RIS 116, and the circuit of each UE for maximizing the minimum secure EE of the system subject to a plurality of constraints. These constraints include a total transmit power budget at the base station 102, unit-modulus constraints for the analog beamforming vectors applied at the TTD-based hybrid beamforming structure, energy conservation constraints in the STAR-RIS 116, and time-delay limitations imposed by the physical characteristics of the TTD units 110.

The optimization circuitry 114 is operatively coupled to the digital baseband module 106, the MRF RF chains 108, the MT TTD units 110, the M PS units 112, and the STAR-RIS 116. The optimization circuitry 114 is configured to execute a method for maximizing a minimum secure EE across all UEs 118 within the system. The secure EE is defined as the ratio of the achievable secure transmission rate to the total energy consumption, including the power used by the base station 102, STAR-RIS 116, and all supporting analog and digital circuitry.

In one embodiment, the optimization circuitry 114 is implemented using FPGAs, which provide reconfigurability and high-throughput parallel processing for real-time decision-making. In another embodiment, the optimization circuitry 114 is realized using ASICs, which are optimized for power-efficient execution of convex and non-convex optimization routines. In yet another embodiment, the optimization circuitry 114 comprises a general-purpose processor, such as an ARM or x86-based processor, executing software libraries that implement numerical optimization techniques.

The optimization tasks performed by the optimization circuitry 114 include, but are not limited to, solving a non-convex optimization problem to maximize the minimum secure EE while satisfying a set of predefined system constraints. These constraints include a total transmit power budget at the base station 102, unit-modulus constraints on the analog beamforming vectors generated by the PS units 112, energy conservation constraints enforced across all STAR-RIS elements, and permissible bounds on time-delay variations introduced by the TTD units 110.

For example, if a total transmit power budget of 1 Watt is specified, the optimization circuitry 114 computes a joint set of beamforming vectors and energy-splitting coefficients to ensure that the secure EE is maximized under this constraint, while also ensuring that each analog beamforming vector has constant amplitude (i.e., unit-modulus), and that the STAR-RIS 116 conserves the sum of reflected and transmitted energy per element.

The optimization process may be performed using fractional programming methods, which iteratively solve a series of parameterized subproblems to optimize a ratio-form objective function, or using alternating iterative search algorithms, which decompose the joint optimization problem into tractable subproblems over analog beamforming, digital precoding, and STAR-RIS configuration variables. The results of this optimization process are used to configure the digital baseband module 106, each RF chain 108, each TTD unit 110, each PS unit 112, and each element of the STAR-RIS 116 for maximized secure EE operation.

Figure 1B:
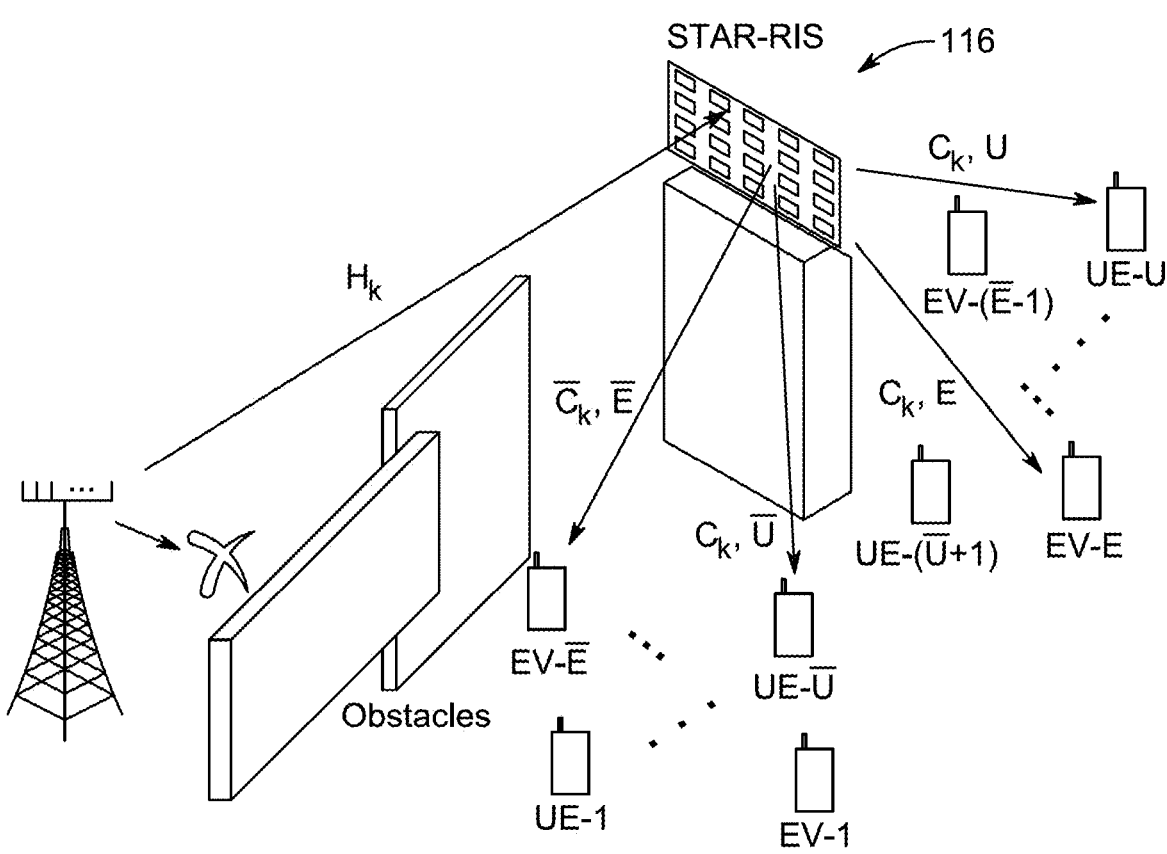
FIG. 1B is a schematic diagram illustrating the signal propagation paths and interaction of signals with the STAR-RIS according to some embodiments of the present disclosure.

FIG. 1B illustrates a schematic representation of a STAR-RIS-assisted near-field OFDM-based wideband terahertz communication system. The system components have been described in conjunction with FIG. 1A. The system includes a base station, a STAR-RIS unit, a plurality of user equipment terminals, and a plurality of eavesdropper terminals. The base station transmits OFDM signals at subcarrier index k toward the STAR-RIS, which is configured to perform simultaneous transmitting and reflecting operations. The THz signal transmitted by the base station propagates through a frequency-dependent channel denoted by $H_k$, representing a complex-valued matrix characterizing the near-field spatial channel between the base station and the STAR-RIS. The channel $H_k$ captures the frequency-dependent spherical wave propagation and spatially varying THz signal attenuation under near-field conditions.

The STAR-RIS operates based on an energy-splitting protocol and applies two separate spatial transformations to the impinging THz waveform. A first transformation corresponds to the reflection operation and is directed toward a plurality of legitimate user terminals, UE-1 through UE-U. A second transformation corresponds to the transmission operation and is directed toward a plurality of passive eavesdropper terminals, EV-1 through EV-E. The reflected signal path associated with each user terminal is characterized by a channel vector $c(k,u)$ for user u, which represents the spatial propagation channel from the STAR-RIS to the UE-u. The total cascaded signal path from the base station to the user UE-u is denoted by $h(k,u)$, and is obtained as the product of the channel vector $c(k,u)$, the STAR-RIS reflection coefficient matrix $\Theta r$, and the BS-to-STAR-RIS channel $H_k$. Each user UE-u is assumed to be located in the reflection region of the STAR-RIS and within the near-field range from both the STAR-RIS and the base station.

On the transmission side, each eavesdropper EV-e receives a THz signal transmitted through the STAR-RIS via a separate channel vector $\bar{c}(k,e)$, which represents the spatial channel between the STAR-RIS and the eavesdropper. The complete transmission-side cascaded signal path is denoted by $\bar{h}(k,e)$ and is obtained by the product of $\bar{c}(k,e)$, the STAR-RIS transmission coefficient matrix $\Theta t$, and the BS-to-STAR-RIS channel Hk. The eavesdroppers EV-1 through EV-E are passive devices situated in the forward transmission region and attempt to intercept the transmitted signals. The directional flows to each eavesdropper are illustrated using channel arrows marked with $\bar{c}(k,e)$, and the interception capacity of each EV-e is characterized by the intercept rate $\bar{r}(e,u)$.

The user terminals UE-1 through UE-U are positioned to receive reflected signals, whereas the eavesdroppers EV-1 through EV-E are situated to receive transmitted signals. Each reflected-side user receives spatially focused THz signals that are beamformed to align with its angular and distance coordinates, while the transmitted signals are manipulated to minimize energy leakage to the eavesdroppers. The STAR-RIS applies independent phase and amplitude control on each of its elements to regulate the reflection and transmission characteristics per subcarrier and per device direction. The beamforming and energy-splitting coefficients are jointly optimized to maximize the minimum secure energy efficiency across all legitimate users while mitigating the impact of eavesdroppers.

FIG. 1B thus illustrates a secure transmission framework under near-field THz propagation, where the simultaneous reflection and transmission functions of the STAR-RIS enable spatial signal shaping over both reflection and transmission regions. The mathematical configuration of a near-field wideband THz channel model is described herein.

TABLE I

| Basic Notations | | | |
|---|---|---|---|
| Notation | Description | Notation | Description |
| U/$\mathcal{U}$ | # of UEs/index set {1, . . . , U} | $H_k$ | channel from BS to STAR-RIS |
| $\mathcal{U}_r$/$\mathcal{U}_t$ | {1, . . . , U}/{U + 1, . . . , U} | $c_{k,u}$ | channel vector from STAR-RIS to UE u |
| E/$\varepsilon$ | # of EVs/index set {1, . . . , E} | $\bar{c}_{k,e}$ | channel vector from STAR-RIS to EV e |
| M/$\mathcal{M}$ | # of BS's transmit antennas/ {1, . . . , M } | $h_{k,u}$ | overall channel from BS to STAR-RIS to UE u |
| N/$\mathcal{N}$ | # of elements at the STAR-RIS / {1, . . . , N} | $\bar{h}_{k,e}$ | overall channel from BS to STAR-RIS to EV e |
| $\varepsilon_r$/$\varepsilon_t$ | {1, . . , E}/{E + 1, ... , E} | $G_{k,u}$ | $\triangleq$ diag($c_{k,u}$)$H_k$ |
| K/$\mathcal{K}$ | # of subcarriers/index set {1, . . . , K} | $\bar{G}_{k,e}$ | $\triangleq$ diag($\bar{c}_{k,e}$)$H_k$ |
| k | subcarrier index, k $\in$ $\mathcal{K}$ | $W_k^D$ | $= [w_{k,1}^D, \dots, w_{k,U}^D]$, digital beamforming |
| $P_u$ | total power required to serve UE u | $W^{PS}$ | $= [W_1^{PS}, \dots, W_{M_{RF}}^{PS}]$, analog beamforming |
| $\theta_{v,n}$ | phase-shift of the n-th element of the STAR-RIS | $W_p^{PS}$ | $= blkdiag([w_{p,1}^{PS}, \dots, w_{p,M_T}^{PS}])$ |
| $\rho_{v,n}$ | amplitude coefficient of the n-th element of the STAR-RIS, $\forall v \in$ {t, r} (transmission/reflection coefficient) | $w_{p,q}^{PS}$ | analog beamformer associated with the p-th RF chain and q-th TTD |
| $\theta_{v,n}$ | $\triangleq [\rho_{v,1}e^{j\theta_{jv,1}}, \dots, \rho_{v,N}e^{\theta_{v,N}}]^T$, $\forall v \in$ {t, r} | $d_p$ | $= [d_{p,1}, \dots, d_{p,M_D}]^T$, time delays of the TTDs |
| $\Theta_v$ | $\triangleq$ diag($\rho_{v,1}e^{j\theta_{jv,1}}, \dots, \rho_{v,N}e^{\theta_{v,N}}$), $\forall v \in$ {t, r} | $D_K$ | $= blkdiag([e^{-j2\pi f_k d_1}, \dots, e^{-j2\pi f_k d_{M_{RF}}}])$ |
| $M_D$ | # of TTD units per RF chain | $r_u^{sec}$ | secure rate of UE u |
| $M_{RF}$ | total number of RF chains | $r_u$ | achievable rate of UE u |
| v(f, $\varphi$, r) | near-field array response vector of the ULA at the BS | $r_{e,u}$ | rate at which EVe intercepts UEu |
| u(f, $\varphi$, $\psi$,r) | near-field array response vector of the UPA | $\chi_u$ | secure EE of UE u |

The overall frequency-domain channel from BS to STAR-RIS to UE u, $h_{k,u} \in \mathbb{C}^{1 \times M}$, and that from the BS to STARRIS to EV e, $\bar{h}_{k,e} \in \mathbb{C}^{1 \times M}$, on the k-th subcarrier, are given by:

$$h_{k,u} = c_{k,u}\Theta_v H_k \tag{1a}$$

$$\bar{h}_{k,e} = \bar{c}_{k,e}\Theta_v H_k \tag{1b}$$

where $u \in \mathcal{U}_v$, e $\in \mathcal{E}_v$ and v $\in$ {t, r}, $\Theta_v \triangleq$ diag($\rho_{v,1}e^{j\theta_{v,1}}, \dots, \rho_{v,N} e^{\theta_{v,N}}$), $\forall v \in$ {t, r}, denotes the transmission/reflection coefficient matrix of the passive STARRIS, with $\rho_{v,n} \in (0,1)$ representing the amplitude coefficient and $\theta_{v,n} \in$

15

16

(0,2π) denoting the phase-shifts of the n-th element of the STAR-RIS, $k \in \mathcal{K}$ 148 $\{1, \ldots, K\}$ denote the set of subcarriers, $H_k \in \mathbb{C}^{M \times N}$ represents the channel between the BS and the STAR-RIS, $c_{k,u} \in \mathbb{C}^{1 \times N}$ and $\bar{c}_{k,e} \in \mathbb{C}^{1 \times N}$ represent the channel vector between the STAR-RIS and UE u, and that between the STAR-RIS and EV e, respectively. Owing to the energy conservation constraint of the passive STAR-RIS, $$\rho_{t,n}^2 + \rho_{r,n}^2 = 1, \forall\, n \in \mathcal{N}.$$

Due to the absorption and scattering of THz waves by atmospheric molecules and tiny particles, the limited scattering characteristics of THz channels are modelled using a scatterer-based ray-tracing approach. This model considers L propagation paths between the BS and the STARRIS. Consequently, the frequency-domain channel between BS and the STAR-RIS, denoted as $H_k$, for the k-th subcarrier, is expressed as:

$$H_k = \sum_{i=1}^{L} \sqrt{\beta_i}\, \alpha_i u(f_k, \phi_i^r, \psi_i^r, r_i^r) v^H(f_k, \varphi_i, r_i), \tag{2}$$

where $\beta_i \triangleq G_B \mathcal{Q}_i$, $G_B$ denotes the antenna gain at the BS, $\mathcal{Q}_i$ is the path loss of the i-th scattering path, $\alpha_i \sim \mathcal{C}\,\mathcal{N}\,(0,1)$ is the complex gain of the i-th scattering path, $$f_k = f_c + \frac{B(2k - 1 - K)}{2K}$$

is the k-th subcarrier frequency for the central frequency $f_c$ and the bandwidth B, K is the number of subcarriers, $$\phi_i^r$$

and $$\psi_i^r$$

denote the azimuth and elevation angle of arrival of the i-th scatterer at the STAR-RIS, $$r_i^r$$

is the distance of the i-th scatterer from the STAR-RIS, $\varphi_i$ and $r_i$ denote the azimuth angle of departure and distance for the i-the scatterer from the BS, $u(f, \phi, \Psi, r) \in \mathbb{C}^{N \times 1}$ denotes the near-field array response vector of the UPA at the STAR-RIS, which is given by $$u(f, \phi, \psi, r) = u_x(f, \phi, \psi, r) \otimes u_z(f, \psi, r) \tag{3a}$$

$$[u_x(f, \phi, \psi, r)]_{n_1} = e^{-j\frac{2\pi f}{c}\left(-\bar{n}_1 d\cos\phi\sin\psi + \frac{\bar{n}_1^2 d^2(1 - \cos^2\phi\sin^2\psi)}{2r}\right)}, \tag{3b}$$

$$[u_z(f, \psi, r)]_{n_2} = e^{-j\frac{2\pi f}{c}\left(-\bar{n}_2 d\cos\psi + \frac{\bar{n}_2^2 d^2(1 - \sin^2\psi)}{2r}\right)}, \tag{3c}$$

for $$\bar{n}_1 = n_1 - \frac{N_1 + 1}{2}, \bar{n}_2 = n_2 - \frac{N_2 + 1}{2}, n_1 \in \{1, \ldots, N_1\}, n_2 \in \{1, \ldots, N_2\}, d$$

is the spacing between the antenna elements, and $v(f, \varphi, r) \in \mathbb{C}^{M \times 1}$ denotes the near-field array response vector of the ULA at the BS, which accounts for the effects of the spatial location:

$$[v(f, \varphi, r)]_m = e^{-j\frac{2\pi f}{c}\left(-\bar{m} d\cos\varphi + \frac{\bar{m}^2 d^2 \sin^2\varphi}{2r}\right)},$$

for $$\bar{m} = m - \frac{M + 1}{2}.$$

Similarly, assuming $L_u$ propagation paths between the STAR-RIS and UE u, and $L_e$ paths between the STAR-RIS and EV e, the frequency-domain channel vectors spanning form STAR-RIS to UE u, $c_{k,u}$, and that from STARRIS to EV e, $\bar{c}_{k,e}$, on the k-th subcarrier:

$$c_{k,u} = \sum_{j=1}^{L_u} \sqrt{\beta_{j,u}}\, \alpha_{j,u} u^H(f_k, \phi_{j,u}^t, \psi_{j,u}^t, r_{j,u}^t), \tag{5a}$$

$$\bar{c}_{k,e} = \sum_{\mathcal{J}=1}^{L_u} \sqrt{\bar{\beta}_{\mathcal{J},e}}\, \bar{\alpha}_{\mathcal{J},e} u^H(f_k, \bar{\phi}_{\mathcal{J},e}^t, \bar{\psi}_{\mathcal{J},e}^t, \bar{r}_{\mathcal{J},e}^t), \tag{5b}$$

where $\beta_{j,u} \triangleq G_S \mathcal{Q}_{j\,u}$, $G_S$ denotes the antenna gain of the STAR-RIS, $\mathcal{Q}_{j\,u}$ and $\alpha_{j,u} \sim \mathcal{C}\,\mathcal{N}\,(0,1)$ denote the path loss and complex channel gain of the j-th scattering path between STAR-RIS and UE u, $$\phi_{j,u}^t$$

and $$\psi_{j,u}^t$$

denote the azimuth and elevation angle of departure for the j-th scattering path between STAR-RIS and the UE u, and $$r_{j,u}^t$$

is the respective distance. The above definitions also hold for $$\overline{\beta}_{\bar{j},e} \triangleq G_S \overline{\mathcal{D}}_{\bar{j},e}, \overline{\alpha}_{\bar{j},e}, \overline{\vartheta}^t_{\bar{j},e}, \overline{\psi}^t_{\bar{j},e}, \text{ and } \overline{r}^t_{\bar{j},e},$$

and similarly apply to the EV e in place of UE u.

Figure 2:
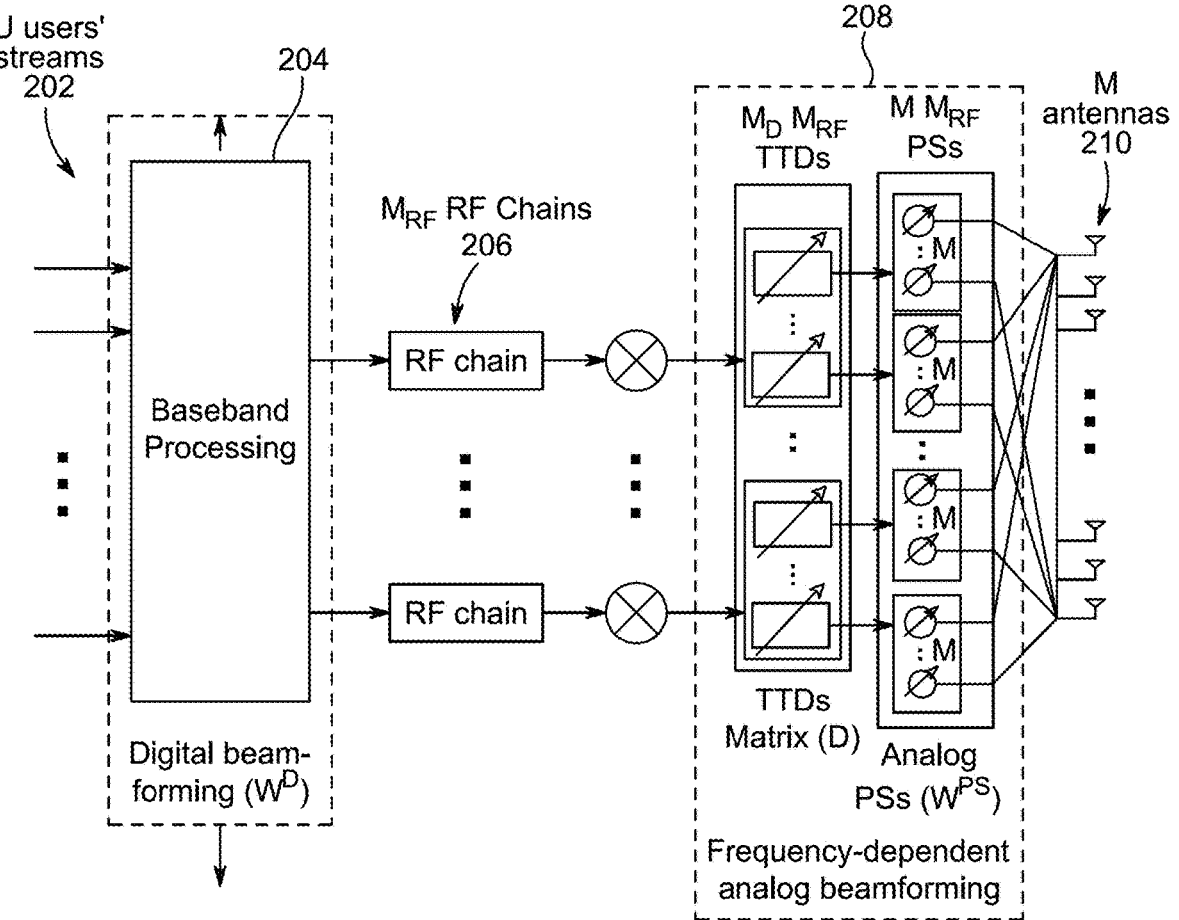
FIG. 2 is a block diagram illustrating a penalty dual decomposition-based secure energy efficiency optimization framework according to some embodiments of the present disclosure.

FIG. 2 illustrates a TTD-based hybrid beamforming architecture configured at a base station for mitigating beam misalignment in a wideband terahertz (THz) communication system. A set of user data streams 202, corresponding to U users, is provided as input to a digital beamforming module (WD) configured to perform baseband digital beamforming operations. The digital beamforming module (WD) comprises a baseband processing block 204, which applies user-specific baseband weights to the set of user data streams 202 to generate pre-coded signals.

The digitally beamformed signals are subsequently forwarded to a set of radio frequency (RF) chains 206. The RF chain configuration comprises $M_{RF}$ chains 206, where $M_{RF} << M$, and each RF chain 206 operates as an intermediate up-conversion stage for analog transmission. The output of each RF chain 206 is then passed through a hybrid analog beamforming unit 208.

The analog beamforming unit 208 comprises a matrix D of true time delay (TTD) units and analog phase shifters (WPS). Specifically, the TTD matrix D is structured as a grid of MD×MRF TTD units, each configured to delay the input signal by a precise time duration to counteract beam misalignment across subcarriers. Each column of the TTD matrix corresponds to a specific RF chain, while each row corresponds to a unique time delay path leading to a downstream antenna.

Following the TTD matrix, the delayed signals are routed through $M_{RF}$ analog phase shifters ($W^{PS}$), each phase shifter configured to apply a phase adjustment to align the signals across spatial directions. The analog beamforming unit 208 outputs frequency-compensated analog signals to a linear antenna array 210 consisting of M antennas.

The use of TTD units in the analog beamforming chain addresses the limitations of conventional PS-based analog beamformers that are frequency-independent and incapable of compensating for frequency selectivity in wideband channels. In wideband THz systems, particularly in STAR-RIS-assisted configurations, the TTD units serve to mitigate the beam splitting effect, a misalignment of beams across subcarriers due to the dispersive nature of the THz channel. This dual-layer compensation is necessary at the base station to counteract both BS-side and STAR-RIS-side beam divergence.

However, recent analyses indicate that when STAR-RIS dimensions remain relatively small, the array gain across subcarriers is nearly constant, thereby eliminating the requirement for implementing TTDs within the STAR-RIS and reducing hardware complexity.

Accordingly, the hybrid beamforming architecture illustrated in FIG. 2 facilitates enhanced wideband beam alignment using a cascaded digital and analog beamforming chain comprising the digital baseband processing block 204, RF chains 206, TTD matrix D, phase shifter matrix WPS, and an M-element linear antenna array 210. The overall architecture enables cost-effective, high-gain, and frequency-resilient transmission in wideband THz systems using only $M_{RF}$RF chains and a structured analog front end.

A sub-connected TTD-based hybrid beamforming architecture at the base station is illustrated in FIG. 2 and realized mathematically herein. Each RF chain connects to M PSs through $M_T$ TTDs, while each TTD connects to $$\frac{M}{M_T}$$

PSs. Consequently, the system consists of $M_{RF}M_T$ TTDs and $M_{RF}M$ PSs in total. Then use $$W^D_k = \left[ w^D_{k,1}, \ldots, w^D_{k,U} \right] \in \mathbb{C}^{M_{RF} \times U}$$

to denote the digital beamforming for U users at the k-th subcarrier. Let $$W^{PS} = \left[ W^{PS}_1, \ldots, W^{PS}_{M_{RF}} \right] \in \mathbb{C}^{M \times M_D M_{RF}}$$

denote the PSs-based frequency-independent analog beamforming, where $$W^{PS}_p = blkdiag\left( \left[ w^{PS}_{p,1}, \ldots, w^{PS}_{p,M_T} \right] \right) \in \mathbb{C}^{M \times M_T}$$

represents the analog beamformer linked to the p-th RF chain through TTDs, while $$w^{PS}_{p,q} \in \mathbb{C}^{\frac{M}{M_T} \times 1}$$

indicates the analog beamformer associated with the q th TTD, $\forall_p \in \mathcal{P} = \{1, \ldots, M_{RF}\}$ and $q \in \mathcal{Q} = \{1, \ldots, M_D\}$. Due to the limitations of the PS hardware, each element of $$w^{PS}_{p,q}$$

must adhere to the constant modulus constraint $$\left| \left[ w^{PS}_{p,q} \right]_r \right| = 1, \forall p, q, r,$$

where $r \in \mathcal{R} = \{1, \ldots, M/M_D\}$. Then use $$D_k = blkdiag\left( \left[ e^{-j2\pi f_k d_1}, \ldots, e^{-j2\pi f_k d_{M_{RF}}} \right] \right) \in \mathbb{C}^{M_D M_{RF} \times M_{RF}}$$

to represent a matrix of TTD units at the k-th subcarrier, which enable frequency-dependent analog beamforming with the PSs, where $d_p = [d_{p,1}, \ldots, d_{p,M_D}]^T \in \mathbb{R}^{M_D \times 1}$ represents the time delays introduced by the TTDs linked to the p-th RF chain, with $d_{p,q} \geq 0$. The phase shifts of matrices $D_k$ and $D_{\bar{k}}$, $\forall k \neq \bar{k}$ are coupled due to their reliance on a shared set of time delays. Thus, the transmitted signal at the k-th subcarrier, $x_k \in \mathbb{C}^{M \times 1}$ TTD-based hybrid beamforming can be represented as follows:

$$x_k = W^{PS} D_k W^D_k s_k = W^{PS} D_k \sum_{u \in U} w^D_{k,u} s_{k,u}; \tag{6}$$

where $s_k = [s_{k,1}, \ldots, s_{k,U}]^T \in \mathbb{C}^{U \times 1}$ represents a vector of information symbols for U users at the k-th subcarrier, satisfying $$\mathbb{E}\{s_k s_k^H\} = I_U.$$

Therefore, using (1a) and (6), the received signal at the k-th subcarrier for UEu, $\forall u \in U_v$, $v \in \{t, r\}$, is given by:

$$y_{ku} = c_{k,u} \Theta_v H_k x_k + n_{k,u} = \qquad (7)$$

$$\theta_v^T G_{k,u} W^{PS} D_k w_{k,u}^D s_{k,u} + \sum_{i \in U, i \neq u} \theta_v^T G_{k,u} W^{PS} D_k w_{k,i}^D s_{k,i} + n_{k,u};$$

where the first factor and the second factor in (7) refer to the desired signal and the inter-user interference for the UE u, $G_{k,u} \triangleq \mathrm{diag}(c_{k,u}) H_k$ is the cascaded channel from BS to STAR-RIS to UE u, $\theta_v \triangleq [\rho_{v,1} e^{j\theta_{v,1}}, \ldots, \rho_{v,N} e^{\theta_{v,N}}]^T$, $\forall_c \in \{t, r\}$, represents the vector of transmission/reflection coefficients of the STAR-RIS, $$n_{k,u} \sim C\mathcal{N}(0, \sigma_{k,u}^2)$$

is the additive white Gaussian noise at the k-th subcarrier. Similarly, using (1b) and (6), the received signal at the k-th subcarrier for EVe, $\forall e \in \mathcal{E}_v$ $v \in \{t, r\}$, intercepting the signal intended for UEu, is given by:

$$\bar{y}_{k,e,u} = \bar{c}_{k,e} \Theta_v H_k x_k + \bar{n}_{k,e}; = \qquad (8)$$

$$\theta_v^T \overline{G}_{k,e} W^{PS} D_k w_{k,e}^D s_{k,u} + \sum_{i \in U, i \neq u} \theta_v^T \overline{G}_{k,e} W^{PS} D_k w_{k,i}^D s_{k,i} + \bar{n}_{k,e}$$

where $\overline{G}_{k,e} \triangleq \mathrm{diag}(\bar{c}_{k,e}) H_k$ is the cascaded channel from BS to STAR-RIS to EV e at the k-the subcarrier, and $$\bar{n}_{k,e} \sim C\mathcal{N}(0, \overline{\sigma}_{k,e}^2)$$

is the complex Gaussian noise.

The disclosure is focused on maximizing the minimum secure EE among all UEs. The secure EE of UE u, $X_u$, is defined as the ratio of its secrecy rate, $$r_u^{sec},$$

to the total power required to serve it, $P_u$, and is expressed as:

$$\chi_u = \frac{r_u^{sec}}{P_u} \qquad (9)$$

where the secrecy rate of $$UE\ u, r_u^{sec},$$

is given by:

$$r_u^{sec} = \left[ \min_{e \in \mathcal{E}} (r_u - \bar{r}_{e,u}) \right]^+$$

where $r_u$ is the achievable rate of UE u, which is given by (in nats/sec/Hz)

$$r_u = \xi \sum_{k \in \mathcal{K}} \underbrace{\ln \left( 1 + \frac{|\theta_v^T G_{k,u} W^{PS} D_k w_{k,u}^D|^2}{\sum_{i \in U, i \neq u} |\theta_v^T G_{k,u} W^{PS} D_k w_{k,i}^D|^2 + \sigma_{k,u}^2} \right)}_{\triangleq r_{k,u}(W_k^D, W^{PS}, \theta_t, \theta_r, D_k)}, \qquad (11)$$

where $\zeta = 1/(K + L_{CP})$, $L_{CP}$ is the length of the cyclic prefix for the OFDM system, the factor $$r_{k,u}(W_k^D, W^{PS}, \theta_t, \theta_r, D_k),$$

in (11), is the achievable rate of UE u at the k-th subcarrier, and $\bar{r}_{e,u}$, in (10), is the achievable rate of EV e while it is intercepting the signal intended for UE u, which is given by:

$$\bar{r}_{e,u} = \xi \sum_{k \in \mathcal{K}} \underbrace{\ln \left( 1 + \frac{|\theta_v^T \overline{G}_{k,e} W^{PS} D_k w_{k,u}^D|^2}{\sum_{i \in U, i \neq u} |\theta_v^T \overline{G}_{k,e} W^{PS} D_k w_{k,i}^D|^2 + \overline{\sigma}_{k,e}^2} \right)}_{\triangleq \bar{r}_{k,e,u}(W_k^D, W^{PS}, \theta_t, \theta_r, D_k)}, \qquad (12)$$

where $$\bar{r}_{k,e,u}(W_k^D, W^{PS}, \theta_t, \theta_r, D_k)$$

the achievable rate of EV e at the k-th subcarrier while it is intercepting the signal intended for UE u.

In equation (9), $P_u$ is the the the total power consumption of the STAR-RIS-aided system required to serve UE u, which is given by:

$$P_u = \frac{1}{UK} \sum_{k \in \mathcal{K}} \|W^{PS} D_k W_k^D\|_F^2 + \mu r_u + \frac{P_c}{U}, \qquad (13)$$

where $P_c = P_{BS} + P_D + M_{RF} P_{RF} + M_{RF} M_T P_{TTD} + M_{RF} M P_{PS} + P_{STAR-RIS} + U P_{UE}$ is the rate-independent power consumption, $P_{BS}$, $P_D$, $P_{RF}$, $P_{TTD}$, $P_{PS}$, $P_{STAR-RIS}$, and $P_{UE}$ represent the power consumption of the BS, digital baseband processing, each RF chain, each TTD element, each PS, the STAR-RIS, and the circuit of each UE, respectively, $$\frac{1}{UK} \sum_{k \in K} \|W^{PS} D_k W_k^D\|_F^2$$

is the average power consumption per user over all the subcarriers, $\mu$ indicates the dynamic power consumption per unit data rate due to coding, decoding, and backhaul operations.

The present embodiment focusses on optimizing digital beamforming $$W_k^D,$$

analog beamforming $W^{PS}$, matrices of TTD units $D_k$, and the transmission/reflection coefficients of the STAR-RIS $\{\theta_t, \theta_r\}$. The objective is to maximize the minimum secure EE, subject to constraints on the transmit power budget, the unit-modulus of the analog beamforming, energy conservation in the STAR-RIS, and the time-delay of the TTD units.

$$\max_{W_k^D, W^{PS}, \theta_t, \theta_r, D_k} \min_{u \in \mathcal{U}} \frac{r_u^{sec}}{P_u} \tag{14a}$$

$$\text{s.t. } \left\| W^{PS} D_k W_k^D \right\|_F^2 \le P_t, \forall k \in \mathcal{K} \tag{14b}$$

$$\left| \left[ w_{p,q}^{PS} \right]_r \right| = 1, \forall p \in \mathcal{P}, q \in \mathcal{Q}, r \in \mathcal{R} \tag{14c}$$

$$\rho_{t,n}^2 + \rho_{r,n}^2 = 1, \forall n \in \mathcal{N} \tag{14d}$$

$$\rho_{v,n} \in [0, 1], \phi_{v,n} \in [0, 2\pi], \forall v \in \{t, r\}, n \in \mathcal{N} \tag{14e}$$

$$d_{p,q} \ge 0, \forall p \in \mathcal{P}, q \in \mathcal{Q} \tag{14f}$$

where constraint (14b) indicates that the transmit power across all subcarriers is bounded by the total transmit power budget $P_t$, constraint enforces the unit-modulus constraint of the PSs-based frequency-independent analog beamforming, constraint (14d) represents the energy conservation constraint of the STAR-RIS, where the law of energy conservation must be satisfied as the energy of the signal incident on each element splits into the energies of the transmitted and reflected signals according to the energy splitting ratios of $$\rho_{t,n}^2 : \rho_{r,n}^2,$$

(14e) addresses the amplitude and phase constraints of the transmission/reflection coefficients of the STAR-RIS, and (14f) refers to the time-delay constraints of the TTD units. The problem is challenging to solve due to the non-convex fractional objective function, the difference between two logarithmic rate expressions in the secrecy rate expression $$r_u^{sec}$$

(which is the numerator of $X_u$), multiuser interference, unit-modulus constraints, and the coupling of optimization variables.

The system model presented through Equations (1)-(14f) establishes the structural and functional foundation of a STAR-RIS-assisted near-field OFDM-based wideband THz communication system. Building upon such architectural configuration, an optimization problem aimed at maximizing the minimum secure energy efficiency (EE) across all UEs has been formulated. The optimization problem is subject to system-level constraints encompassing total transmit power, unit-modulus analog beamforming, STAR-RIS energy conservation, and time-delay limitations of the TTD units. The system model serves as the mathematical and operational basis for this optimization, enabling joint control of the base station, STAR-RIS, and end-user circuitry in accordance with secure and energy-efficient communication objectives.

To deal with the fractional objective function $$X_u = r_u^{sec} / P_u$$

in problem defined in equation (14), introduce auxiliary variables $\ell = \{ \ell_1, \ldots, \ell_U \}$ and $0 = \{0_1, \ldots, 0_U\}$ transform equation (14) to the following equivalent problem:

$$\max_{X, \ell, o, W_k^D, W^{PS}, \theta_t, \theta_r, D_k} X \tag{15a}$$

$$\text{s.t. } X \le \frac{\ell_u^2}{o_u}, \forall u \in \mathcal{U}, \tag{15b}$$

$$\ell_u^2 \le r_u^{sec}, \forall u \in \mathcal{U}, \tag{15c}$$

$$o_u \ge P_u, \forall u \in \mathcal{U}, \tag{15d}$$

$$(14b)\text{-}(14f). \tag{15e}$$

Using equations (10), (11), (12), and (13), problem in equation (15) can be written as:

$$\max_{X, \ell, o, W_k^D, W^{PS}, \theta_t, \theta_r, D_k} X \tag{16a}$$

$$\text{s.t. } \ell_u^2 \le \xi \left( \sum_{k \in \mathcal{K}} r_{k,u} - \sum_{k \in \mathcal{K}} \bar{r}_{k,e,u} \right), \forall u \in \mathcal{U}, e \in \mathcal{E}, \tag{16b}$$

$$o_u \ge \frac{1}{UK} \sum_{k \in \mathcal{K}} \left\| W^{PS} D_k W_k^D \right\|_F^2 + \mu \xi \sum_{k \in \mathcal{K}} r_{k,u} + \frac{P_c}{U}, \forall u \in \mathcal{U}, \tag{16c}$$

$$(14b)\text{-}(14f), (15b); \tag{16d}$$

To address the non-convex constraint (16b), auxiliary variables $r_{k,u}$ and $\bar{r}_{k,e,u}, \forall k \in \mathcal{K}, e \in \mathcal{E}, u \in \mathcal{U}$ are introduced. Consequently, problem (16) can be reformulated as:

$$\max_{X, \ell, o, W_k^D, \bar{r}_{k,e,u}, r_{k,u}, W^{PS}, \theta_t, \theta_r, D_k} X \tag{17a}$$

$$\text{s.t. } \ell_u^2 \le \xi \left( \sum_{k \in \mathcal{K}} r_{k,u} - \sum_{k \in 1} \bar{r}_{k,e,u} \right), \forall u \in \mathcal{U}, e \in \mathcal{E}; \tag{17b}$$

$$o_u \ge \frac{1}{UK} \sum_{k \in K} \left\| W^{PS} D_k W_k^D \right\|_F^2 + \mu \xi \sum_{k \in \mathcal{K}} r_{k,u} + \frac{P_c}{U}, \forall u \in \mathcal{U}; \tag{17c}$$

$$r_{k,u} \le r_{k,u} \left( W_k^D, w_{p,q}^{PS}, \theta_t, \theta_r, D \right), \forall u \in \mathcal{U}, k \in \mathcal{K}; \tag{17d}$$

$$\bar{r}_{k,e,u} \ge \bar{r}_{k,e,u} \left( W_k^D, w_{p,q}^{PS}, \theta_t, \theta_r, D \right), \forall u \in \mathcal{U}, k \in \mathcal{K}, e \in \mathcal{E} \tag{17e}$$

$$(14b) - (14f), (15b); \tag{17f}$$

Problem in equation (17) is still non-convex due to the non-convex constraints (14b), (14c), (14d), (15b), (17c), (17d), and (17e). To proceed further, additional auxiliary variables are introduced, such as $$W_k = [w_{k,1}, \dots, w_{k,U}] = W^{PS} D_k W_k^D \in \mathbb{C}^{M \times U}, \forall k \in \mathcal{K},$$

$$z_{k,u} = [z_{k,u,1}, \dots, z_{k,u,U}] = \theta_v^T G_{k,u} W_k \in \mathbb{C}^{1 \times U}, \forall k \in \mathcal{K}, u \in \mathcal{U}_v, v \in \{t, r\},$$

$$\text{and } \bar{z}_{k,e} = [\bar{z}_{k,e,1}, \dots, \bar{z}_{k,e,U}] = \theta_v^T \bar{G}_{k,e} W_k \in \mathbb{C}^{1 \times U}, \forall k \in \mathcal{K}, e \in \mathcal{E}_v, v \in \{t, r\}$$

to transform the rate expressions in (11) and (12) as follows:

$$r_{k,u}(z_{k,u}) = \ln\left(1 + \frac{|z_{k,u,u}|^2}{\sum_{i \in U, i \neq u} |z_{k,u,i}|^2 + \sigma_{k,u}^2}\right) \tag{18}$$

$$\bar{r}_{k,e,u}(\bar{z}_{k,e}) = \ln\left(1 + \frac{|\bar{z}_{k,e,u}|^2}{\sum_{i \in U, i \neq u} |\bar{z}_{k,e,i}|^2 + \bar{\sigma}_{k,e}^2}\right) \tag{19}$$

Therefore, using (18) and (19), along with the auxiliary variables $W_k$, $\bar{z}_{k,e}$, and $z_{k,u}$, problem (17) can be reformulated as the following problem:

$$\max_{\mathcal{X}, \ell, o, W_k^D, \bar{r}_{k,e,u}, r_{k,u}, W^{PS}, \theta_t, \theta_r, D, z_{k,u}, \bar{z}_{k,e}} \mathcal{X} \tag{20a}$$

$$\text{s.t. } o_u \geq \frac{1}{UK} \sum_{k \in K} \|W_k\|_F^2 + \mu\xi \sum_{k \in \mathcal{K}} r_{k,u} + \frac{P_c}{U}, \forall u \in \mathcal{U}, \tag{20b}$$

$$\|W_k\|_F^2 \leq P_t, \forall k \in \mathcal{K}, \tag{20c}$$

$$r_{k,u} \leq r_{k,u}(z_{k,u}), \forall u \in \mathcal{U}, k \in \mathcal{K} \tag{20d}$$

$$\bar{r}_{k,e,u} \geq \bar{r}_{k,e,u}(\bar{z}_{k,e}), \forall u \in \mathcal{U}, k \in \mathcal{K}, e \in \mathcal{E} \tag{20e}$$

$$W_k = W^{PS} D_k W_k^D, \forall k \in \mathcal{K}, \tag{20f}$$

$$z_{k,u} = \theta_v^T G_{k,u} W_k, \forall k \in \mathcal{K}, u \in \mathcal{U}_v, v \in \{t, r\}, \tag{20g}$$

$$\bar{z}_{k,e} = \theta_v^T \bar{G}_{k,e} W_k, \forall k \in \mathcal{K}, e \in \mathcal{E}_v, v \in \{t, r\}, \tag{20h}$$

$$(14c) - (14f), (15 b), (17 b), \tag{20i}$$

In equation (20), equality constraints (20f)-(20h) are introduced to address the coupling among the optimization variables. To handle these constraints, the penalty dual decomposition (PDD) method is adopted, which operates by constructing an augmented Lagrangian for the original optimization problem. By introducing the dual variables $\Lambda_k \in \mathbb{C}^{M \times U}$, $\forall k \in \mathcal{K}$, and $\tau_{k,u} \in \mathbb{C}^{1 \times U}$, $\forall k \in \mathcal{K}$, $u \in \mathcal{U}$, and $\bar{\tau}_{k,e} \in \mathbb{C}^{1 \times U}$, $\forall k \in \mathcal{K}$, $e \in \mathcal{E}$, corresponding to the equality constraints (20f)-(20h), respectively, (20) can be transformed into the following augmented Lagrangian problem:

$$\max_{\mathcal{X}, \ell, o, W_k, W_k^D, \bar{r}_{k,e,u}, r_{k,u}, W^{PS}, \theta_t, \theta_r, D_k, z_{k,u}, \bar{z}_{k,e}} \mathcal{X} - \tag{21a}$$

$$\mathcal{L}\left(W, W^{PS}, D_k, W^D, z_{k,u}, \bar{z}_{k,e}, \theta_t, \theta_r\right)$$

$$\text{s.t. } (14c) - (14f), (15b), (17b), (20b) - (20e), \tag{21b}$$

24 where $\mathcal{L}$ $(W, W^{PS}, D_k, W^D, z_{k,u}, \bar{z}_{k,e}, \theta_t, \theta_r)$ is the augmented Lagrangian factor, which is given by:

$$\mathcal{L}\left(W_k, W_k^{PS}, D_k, W_k^D, z_{k,u}, \bar{z}_{k,e}, \theta_t, \theta_r\right) = \tag{22}$$

$$\sum_k \frac{1}{2\zeta} \left\|W_k - W^{PS} D_k W_k^D + \zeta\Lambda_k\right\|_F^2 + \sum_{k,u,v}$$

$$\frac{1}{2\zeta}\left\|z_{k,u} - \theta_v^T G_{k,u} W_k + \zeta\tau_{k,u}\right\|^2 + \sum_{k,e,v} \frac{1}{2\zeta}\left\|\bar{z}_{k,e} - \theta_v^T \bar{G}_{k,e} W_k + \zeta\bar{\tau}_{k,e}\right\|^2$$

where $\zeta \geq 0$ represents the penalty factor. The PDD framework operates in a double-loop structure. The inner loop addresses the solution of the augmented Lagrangian problem (21), while the outer loop updates the dual variables $\Lambda_k$, $\tau_{k,u}$, and $\bar{\tau}_{k,e}$, as well as the penalty factor $\zeta$, based on the outcomes of the inner loop. In order to solve problem (21), employ the block coordinate descent (BCD) method by dividing it into five subproblems, with respect to (w.r.t.)

$$\{W_k, z_{k,u}, \bar{z}_{k,e}, \mathcal{X}, \ell, o, r_{k,u}, \bar{r}_{k,e,u}\}, \{\theta_t, \theta_r\}, \{W^{PS}\}, \{W_k^D\}, \text{and } \{D_k\},$$

respectively. These subproblems are discussed as follows:
The subproblem w.r.t. $\{W_k, z_{k,u}, \bar{z}_{k,e}, \mathcal{X}, \ell, o, \bar{r}_{k,e,u}, r_{k,u}\}$, while keeping the other optimization variables in (21) fixed, is given by:

$$\max_{\mathcal{X}, \ell, o, W_k, \bar{r}_{k,e,u}, r_{k,u}, z_{k,u}, \bar{z}_{k,e}} = \mathcal{X} - \sum_k \frac{1}{2\zeta}\left\|W_k - W^{PS} D_k W_k^D + \zeta\Lambda_k\right\|_F^2 - \tag{23a}$$

$$\sum_{k,u,v} \frac{1}{2\zeta}\left\|z_{k,u} - \theta_v^T G_{k,u} W_k + \zeta\tau_{k,u}\right\|^2 -$$

$$\sum_{k,e,v} \frac{1}{2\zeta}\left\|\bar{z}_{k,e} - \theta_v^T \bar{G}_{k,e} W_k + \zeta\bar{\tau}_{k,e}\right\|^2$$

$$\text{s.t. } (15b), (17b), (20b) - (20e), \tag{23b}$$

which is non-convex due to the non-convex constraints (15b), (20d), and (20e). In what follows, convex approximations for these non-convex constraints are found. Given that the right hand side of the constraint (15b), i.e., $$\frac{\ell_u^2}{o_u},$$

is convex in $\ell_u$ and $o_u$, employ Taylor series expansion to find its lower bound, $f_u(\ell_t, o_u)$, about the point $(\hat{\ell}_u, \hat{o}_u)$, which is given by $$\frac{\ell_u^2}{o_u} \geq f_u(\ell_u, O_u) \triangleq (2\hat{\ell}_u/\hat{o}_u)\ell_u - (\hat{\ell}_u/\hat{o}_u)^2 o_u, \tag{24}$$

where $\hat{\ell}_u$ and $\hat{o}_u$ represent the values of $\ell_u$ and $o_u$ from the previous iteration in the inner loop. Using (24), the non-convex constraint (15b) can be approximated by the following convex constraint:

$$\xi \leq f_u(\ell_u, o_u), \forall u \in \mathcal{U}. \tag{25}$$

Next, address the non-convex constraint (20d). In this regard, use the following inequality for any $(a, b) \in \mathbb{C} \times \mathbb{C}$, about the previously optimized point $(\hat{a}, \hat{b}) \in \mathbb{C} \times \mathbb{C}$ $$\ln\left(1 + \frac{|a|^2}{|b|^2 + \sigma^2}\right) \ge \ln\left(1 + \frac{|\hat{a}|^2}{|\hat{b}|^2 + \sigma^2}\right) - \frac{|\hat{a}|^2 + \sigma^2}{|\hat{b}|^2 + \sigma^2} + \frac{\sigma^2}{|\hat{a}|^2 + |\hat{b}|^2 + \sigma^2} + \frac{2\mathbb{R}\{(\hat{a}) * a\}}{|\hat{b}|^2 + \sigma^2} - \frac{|\hat{a}|^2(|a|^2 + |b|^2)}{(|\hat{a}|^2 + |\hat{b}|^2 + \sigma^2)(|\hat{b}|^2 + \sigma^2)}; \tag{26}$$

Using (26) for $(|a|^2, |b|^2)$ $(|z_{k,u,u}|^2, \Sigma_{i \in U, i \ne u}|z_{k,u,i}|^2)$ and $(|d|^2, |b|^2) = (|\hat{z}_{k,u,u}|^2, \Sigma_{i \in U, i \ne u}, |\hat{z}_{k,u,i}|^2)$, while $\hat{z}_{k,u,i}$ representing the optimized value of $z_{k,u,i}$ from the previous iteration, a lower bounding convex approximation of $r_{k,u}(z_{k,u})$ is given by:

$$r_{k,u}(z_{k,u}) \ge \hat{r}_{k,u}(z_{k,u}) \triangleq \hat{c}_{k,u} + 2\mathbb{R}\{\hat{\delta}_{k,u}z_{k,u,u}\} - \hat{e}_{k,u}\sum_{i \in U}|z_{k,u,i}|^2 \tag{27}$$

where $\hat{c}_{k,u} \triangleq \ln\left(1 + \frac{|\hat{z}_{k,u,u}|^2}{\sum_{i \in U, i \ne u}|\hat{z}_{k,u,i}|^2 + \sigma_{k,u}^2}\right) -$ $$\frac{|\hat{z}_{k,u,u}|^2 + \sigma_{k,u}^2}{\sum_{i \in U, i \ne u}|\hat{z}_{k,u,i}|^2 + \sigma_{k,u}^2} + \frac{\sigma_{k,u}^2}{\sum_{i \in U}|\hat{z}_{k,u,i}|^2 + \sigma_{ku}^2},$$

$$\hat{d}_{k,u} \triangleq \frac{\hat{z}_{k,u,u}^*}{\sum_{i \in U, i \ne u}|\hat{z}_{k,u,i}|^2 + \sigma_{k,u}^2}, \text{ and } \hat{e}_{k,u} \triangleq |\hat{z}_{k,u,u}|^2$$

Using the non-convex constraint (20d) can be approximated by the following convex constraint:

$$r_{k,u} \le \hat{r}_{k,u}(z_{k,u}), \forall u \in \mathcal{U}, k \in \mathcal{K}. \tag{28}$$

Finally, the remaining non-convex constraint (20e) may be addressed for the subproblem (23). To this end, use the following inequality for any $(a, b) \in \mathbb{C} \times \mathbb{C}$, about the previously optimized point $(\hat{a}, \hat{b}) \in \mathbb{C} \times \mathbb{C}$ $$\ln\left(1 + \frac{|a|^2}{|b|^2 + \sigma^2}\right) \le \tag{29}$$

$$\ln\left(1 + \frac{|\hat{a}|^2}{|\hat{b}|^2 + \sigma^2}\right) + \frac{|\hat{b}|^2}{\sigma^2} - \frac{|\hat{a}|^2\sigma^2}{(|\hat{a}|^2 + |\hat{b}|^2 + \sigma^2)(|\hat{b}|^2 + \sigma^2)} +$$

$$\frac{|\hat{a}|^2 + |\hat{b}|^2}{|\hat{a}|^2 + |\hat{b}|^2 + \sigma^2} - \frac{2\mathcal{R}\{|\hat{b}|^2 * \bar{b}\}}{\sigma^2} + \frac{|\hat{b}|^2|\bar{b}|^2}{(|\hat{b}|^2 + \sigma^2)\sigma^2}$$

Using (29) for $(|\dot{d}|^2, |\bar{b}|^2) = (|\bar{z}_{k,e,u}|^2, \Sigma_{i \in U, i \ne u}|\bar{z}_{k,e,i}|^2)$ and $(|\bar{a}|^2, |\bar{b}|^2) = (|\bar{z}_{k,e,u}|^2, \Sigma_{i \in U, i \ne u}|\bar{z}_{k,e,i}|^2)$, while $\bar{z}_{k,e,i}$ representing the optimized value of $\bar{z}_{ke,i}$ from the previous iteration, an upper bounding concave approximation of $\bar{r}_{k,e,u}(\bar{z}_{k,e})$ is given by $$\bar{r}_{k,e,u}(\bar{z}_{k,e}) \le \hat{\bar{r}}_{k,e,u}(\bar{z}_{k,e}) \triangleq \tag{30}$$

$$\hat{\bar{c}}_{k,e,u} - \frac{2}{\sigma^2}\sum_{i \in U, i \ne u}\mathbb{R}\{\hat{\bar{z}}_{k,e,i}^*\bar{z}_{k,e,i}\} + \hat{\bar{d}}_{k,u}\sum_{i \in U}|\bar{z}_{k,e,i}|^2 +$$

$$|\bar{\bar{c}}_{k,e,u}|^2\sum_{i \in U, i \ne u}|z_{k,e,i}|^2 \text{ where } \hat{\bar{c}}_{k,e,u} \triangleq \ln\left(1 + \frac{|\hat{\bar{z}}_{k,e,u}|^2}{\sum_{i \in U, i \ne u}|\hat{\bar{z}}_{k,e,i}|^2 + \sigma_{k,e}^2}\right) +$$

$$\frac{\sum_{i \in U, i \ne u}|\hat{\bar{z}}_{k,e,i}|^2}{\sigma_{k,e}^2} - \frac{|\hat{\bar{z}}_{k,e,u}|^2\hat{\bar{d}}_{k,u}\sigma_{k,e}^2}{\sum_{i \in U, i \ne u}|\hat{\bar{z}}_{k,e,i}|^2 + \sigma_{k,e}^2},$$

$$\hat{\bar{d}}_{k,u} \triangleq \left(\sum_{i \in U}|\hat{\bar{z}}_{k,e,i}|^2 + \sigma_{k,e}^2\right)^{-1}, \text{ and } \hat{\bar{e}}_{k,e,u} \triangleq$$

$$\frac{\sum_{i \in U, i \ne u}|\hat{\bar{z}}_{k,e,i}|^2}{\left(\sum_{i \in U, i \ne u}|\hat{\bar{z}}_{k,e,i}|^2 + \sigma_{kj,e}^2\right)\sigma_{k,e}^2}.$$

Using (30), the non-convex constraint (20e) can be approximated by the following convex constraint:

$$\bar{r}_{k,e,u} \le \hat{\bar{r}}_{k,e,u}(\bar{z}_{k,e}), \forall u \in \mathcal{U}, k \in \mathcal{K}, e \in \mathcal{E} \tag{31}$$

Therefore, using the convex constraints (25), (28), and (31), problem (23) is approximated by the following optimization problem:

$$\max_{\chi, \ell, o, W_k, \bar{r}_{k,e,u}, r_{k,u}, z_{k,u}, \bar{z}_{k,e}} = \chi - \sum_k \frac{1}{2\zeta}\left\|W_k - W^{PS}D_kW_k^D + \zeta\Lambda_k\right\|_F^2 - \tag{32a}$$

$$\sum_{k,u,v}\frac{1}{2\zeta}\left\|z_{k,u} - \theta_v^T G_{k,u}W_k + \zeta\tau_{k,u}\right\|^2 -$$

$$\sum_{k,e,v}\frac{1}{2\zeta}\left\|\bar{z}_{k,e} - \theta_v^T \bar{G}_{k,e}W_k + \zeta\tau_{k,e}\right\|^2$$

Subject to (25), (17b), (20b), (20c), (28), (31). $\tag{32b}$

Given that (32) is a convex problem, it can be effectively solved using convex optimization tools, such as CVX.

Now, a subproblem with respect to $\{\theta_t, \theta_r\}$ is described here. Recalling the definition of transmitting/reflection coefficients of the STAR-RIS, $\theta_v \triangleq [\rho_{v,1}e^{j\theta v,1}, \ldots, \rho_{v,N}e^{\theta_{v,N}}]^T$, $\forall v \in \{t, r\}$, the subproblem w.r.t. $\{\theta_t, \theta_r\}$, while keeping the other optimization variables in (21) fixed, is given by:

$$\min_{\theta_t, \theta_r}\sum_{k,u,v}\left\|z_{k,u} - \theta_v^T G_{k,u}W_k + \zeta\tau_{k,u}\right\|^2 + \tag{33a}$$

$$\sum_{k,e,v}\left\|\bar{z}_{k,e} - \theta_v^T \bar{G}_{k,e}W_k + \zeta\tau_{k,e}\right\|^2$$

s.t. (14d), (14e), $\tag{33b}$ which can be expressed as:

$$\min_{\theta_t, \theta_r} \sum_{k \in K} \sum_{v \in \{t,r\}} \sum_{w \in \mathcal{W}_v} \left\| \tilde{z}_{k,w} - \theta_v^T \tilde{G}_{k,w} W_k + \zeta \tilde{\tau}_{k,w} \right\|^2 \qquad (34a)$$

$$\text{s.t. } (14d), (14e), \qquad (34b)$$

where $w \in \mathcal{W} = \{1, \ldots, U, U+1, \ldots, U+E\}$, $\mathcal{W}_r = \{1, \ldots, \overline{U}, U+1, \ldots, U+E\}$, $\mathcal{W}_t = \{\overline{U}+1, \ldots, U, U+E+1 \ldots, U+E\}$, $$\tilde{z}_{k,w} = \begin{cases} z_{k,u}, & w = u \\ \overline{z}_{k,e}, & w = U+e \end{cases} \qquad (35a)$$

$$\tilde{G}_{k,w} = \begin{cases} G_{k,u}, & w = u \\ \overline{G}_{k,e}, & w = U+e \end{cases} \qquad (35b)$$

$$\tilde{\tau}_{k,w} = \begin{cases} \tau_{k,u}, & w = u \\ \overline{\tau}_{k,e}, & w = U+e \end{cases} \qquad (35c)$$

The subproblem with respect to $W^{PS}$ is described here. The subproblem w.r.t. $W^{PS}$, while keeping the other optimization variables in (21) fixed, is given by:

$$\min_{W^{PS}} \sum_{K} \left\| W_k - W^{PS} D_k W_k^D + \zeta \Lambda_k \right\|_F^2 \text{ s.t. } (14c) \qquad (36)$$

which can be rewritten in the following equivalent form:

$$\min_{W^{PS}} tr\left((W^{PS})^H W^{PS} \Upsilon\right) - 2\mathbb{R}\{tr\left((W^{PS})^H \Omega\right)\}, \qquad (37)$$
$$\text{s.t.} \qquad (14c)$$

where $$\Upsilon \triangleq \sum_{k \in \mathcal{K}} D_k W_k^D \left(D_k W_k^D\right)^H \qquad (38)$$

$$\Omega \triangleq \sum_{k \in \mathcal{K}} (W_k + \zeta \Lambda_k)\left(D_k W_k^D\right)^H \qquad (39)$$

The subproblem with respect to $$W_k^D,$$

while keeping the other optimization variables in (21) fixed, is given by:

$$\min_{W_k^D, \forall k \in \mathcal{K}} \sum_k \left\| W_k - W^{PS} D_k W_k^D + \zeta \Lambda_k \right\|_F^2, \qquad (40)$$

which is an unconstrained optimization problem because the power constraint (14b) has been transformed into the constraint (20c) due to the introduction of the auxiliary variables $W_k$. In this transformation, the constraint (20c) does not involve the optimization variable $$W_k^D.$$

The problem (40) is convex and exhibit the following solution:

$$W_k^D = \left(\left(W_k^{PS} D_k\right)^H \left(W_k^{PS} D_k\right)\right)^{-1} \left(W_k^{PS} D_k\right)^H \times (W_k + \zeta \Lambda_k), \forall k \qquad (41)$$

The subproblem with respect to $D_k$, while keeping the other optimization variables in (21) fixed, is given by:

$$\min_{D_k} \sum_k \left\| W_k - W^{PS} D_k W_k^D + \zeta \Lambda_k \right\|_F^2 \qquad (42)$$
$$\text{s.t. } d_{p,q} \geq 0, \forall p \in \mathcal{P}, q \in Q$$

By substituting $D_k = \text{blkdiag}([e^{-2\pi f_k d_1}, \ldots, e^{-j2\pi f_k d_{MRF}}])$ into (40) and recalling the definition $d_p = [d_{p,1}, \ldots, d_{p,M_D}]^T$, reformulate (42) in terms of $d_{p,q}$. Since $D_k$ is periodic in $d_{p,q}$ with a period of $1/f_k$, the objective function is also periodic in $d_{p,q}$. Thus, any negative value of $d_{p,q}$ can be replaced by a positive value without changing the value of the objective function. As a result, the constraint $d_{p,q}$ greater than or equal to 0 can be omitted. Without this constraint, problem (42) becomes an unconstrained optimization problem, allowing $d_{p,q}$ to be directly optimized using the quasi-Newton method.

The optimization procedure comprises an iterative process wherein a set of primary optimization variables, including precoding matrices, auxiliary variables, and rate expressions, are updated within an inner loop of a penalty dual decomposition (PDD) framework. These variables include beamforming matrices for each subcarrier, reflection and transmission coefficients associated with the STAR-RIS, analog and digital precoding matrices, and hybrid beamforming decomposition parameters.

Inside the inner loop of the PDD framework, $\{W_k, z_{k,w}, \overline{z}_{k,e}, X, \ell, o, r_{k,u}, \overline{r}_{k,e,u}\}$, $\{\theta_t, \theta_r\}$, $\{W^{PS}\}$, $$\{W_k^D\},$$

and $\{D_k\}$, are iteratively optimized. On the other hand, the dual variables $\{\Lambda_k, \tau_{k,u}, \overline{\tau}_{k,e}\}$ and the penalty factor $\zeta$ are updated in the outer loop such that if the violation of the equality constraints (20f)-(20h), (which can be measured by the function below) the penalty factor or the dual variables are updated:

$$g = \max\{\left\| W_k - W^{PS} D_k W_k^D \right\|_\infty, \left\| z_{k,u} - \theta_v^T G_{k,u} W_k \right\|_\infty, \qquad (43)$$
$$\left\| \overline{z}_{k,e} - \theta_v^T \overline{G}_{k,e} W_k \right\|_\infty, \forall k \in \mathcal{K}, u \in \mathcal{U}_v$$
$$e \in \mathcal{E}_v, v \in \{t, r\}\}.$$

| Algorithm 1 Disclosed algorithm for solving (21) | |
|---|---|
| 1. | Initialize the optimization variables. |
| 2. | repeat |
| 3. | repeat |
| 4. | Update $\{W_k, z_{k,u}, \bar{z}_{k,e}, \chi, \ell, o, r_{k,u}, \bar{r}_{k,e,u}\}$ by solving problem (32). |
| 5. | Update $\{\theta_r, \theta_t\}$ by following the solution in Section III-B. |
| 6. | Update $\{W^{PS}\}$ by following the solution in Section III-C. |
| 7. | Update $\{W_k^D\}$ by (41). |
| 8. | Update $\{D_k\}$ by following the solution in Section III-E. |
| 9. | until convergence |
| 10. | if $g < g^{th}$ then |
| 11. | update the dual variables $\{\Lambda_k, \tau_{k,u}, \bar{\tau}_{k,e}\}$ by (44). |
| 12. | else |
| 13. | update the penalty factor $\zeta \leftarrow \varrho \zeta$ |
| 14. | end if |
| 15. | until g falls below a predefined threshold. |

If $g$ is below than a predefined threshold $g^{th}$, penalty factor remains unchanged, while the dual variables are updated using gradient descent.

$$\Lambda_k \leftarrow \Lambda_k + \zeta^{-1}\left(W_k - W^{PS}D_kW_k^D\right), \forall k \in \mathcal{K} \quad (44a)$$

$$\tau_{k,u} \leftarrow \tau_{k,u} + \zeta^{-1}\left(z_{k,u} - \theta_v^T G_{k,u}W_k\right), \forall k \in \mathcal{K}, u \in \mathcal{U}_v, v \in \{t, r\} \quad (44b)$$

$$\bar{\tau}_{k,e} \leftarrow \bar{\tau}_{k,e} + \zeta^{-1}\left(\bar{z}_{k,e} - \theta_v^T \bar{G}_{k,e}W_k\right), x\forall k \in \mathcal{K}, e \in \mathcal{E}_v, v \in \{t, r\} \quad (44c)$$

On the other hand, if $g > g^{th}$, the dual variables remain unchanged, and the penalty factor is updated as $\zeta \leftarrow \varrho \zeta$, where $0 < \varrho < 1$ is a reduction factor. Given the dual variables $\{\Lambda_k, \tau_{k,u}, \bar{\tau}_{k,e}\}$ and the penalty factor $\zeta$, the problem (21) is solved using the block coordinate descent approach, ensuring a non-decreasing objective value across iterations within the inner loop. Additionally, since the maximum power constraint imposes an upper bound on the objective value, the proposed algorithm is guaranteed to converge to a stationary point of problem (20), which corresponds to a stationary point of the original problem (14). The proposed algorithm for solving problem (21) is summarized in Algorithm 1.

The main source of complexity in the proposed algorithm arises from the BCD iterations within the inner loop. In particular, each BCD iteration includes solving optimization problems (32), (34), (37), (40), and (42), the complexities of which are given by $$O\left((2KEU + KU^2 + KU + KMU + 2U + 1)^3(KEU + KU + K + 2U + EU)\right),$$

$$O(1), O(1), O\left(M_{RF}^3\right), \text{ and } O\left(M_{RF}^2 M_D^2\right),$$

respectively.

The present disclosure provides numerical results to evaluate the performance of the proposed algorithm within a three-dimensional simulation environment. In the simulated setup, the simultaneously transmitting and reflecting reconfigurable intelligent surface (STAR-RIS) was positioned along the xz-plane. The base station (BS) was located at coordinates (0, 0, 5) meters, while the STAR-RIS was positioned at (0, 10, 5) meters. A plurality of user equipment (UEs) and eavesdroppers (EVs) were randomly distributed within a five-meter radius on either side of the STAR-RIS. In the exemplary configuration, the network comprises U=4 UEs. Unless explicitly specified otherwise, the simulation further assumes E=4 EVs, M=128 antennas at the BS, and N=6×6=36 STAR-RIS elements. The transmit power budget is set to $P_t$=30 dBm, $\bar{U}$=2, and $\bar{E}$=2. To model power consumption, the rate-dependent power factor $\mu$ is assigned a value of 0.1 watts per bit per second per hertz (W/(bit/s/ Hz)). The rate-independent power consumption values are derived from practical references, and include $P_{BS}$=3 W, $P_D$300 mW, $P_{RF}$=200 mW, $P_{PS}$=30 mW, $P_{TTD}$=100 mW, and $P_{UE}$=100 mW. The STAR-RIS is further configured with PIN diodes and control circuits, consuming 0.33 mW and 10 W per element, respectively. It was considered that $M_{RF}$=4RF chains and $M_D$=8TTD units per RF chain. It was assumed that L=4, $L_u$=4 and $L_e$=4 propagation paths between BS and the STAR-RIS, STAR-RIS and the UEs, and STAR-RIS and the EVs, respectively, $\forall u \in \mathcal{U}$, and $\forall e \in \mathcal{E}$. The noise power density is assumed to be −174 dBm/Hz, antenna gains at the BS and STAR-RIS are set to $G_B$=25 dBi and $G_S$=20 dBi, respectively, carrier frequency is set to $f_c$==0.1 THz, number of subcarriers is set to 10, and OFDM cyclic prefix length is considered to be $L_{CP}$=4.

The path loss of the i-th scattering path between the BS and the STAR-RIS is set to $$\Omega_i \triangleq \left(\frac{c}{4\pi f_c r_i}\right)^2 e^{-k_{abs}(f_c)r_i},$$

where $r_i$ is the distance of the i-th scattering path between the BS and the STAR-RIS and $k_{abs}(f_c)$ is the frequency-dependent medium absorption coefficient, which is obtained from the high-resolution transmission database. Similarly, $$\mathcal{L}_{j,u} \triangleq \left(\frac{c}{4\pi f_c r_{j,u}}\right)^2 e^{-k_{abs}(f_c)r_{j,u}}.$$

Figures 3, 4:
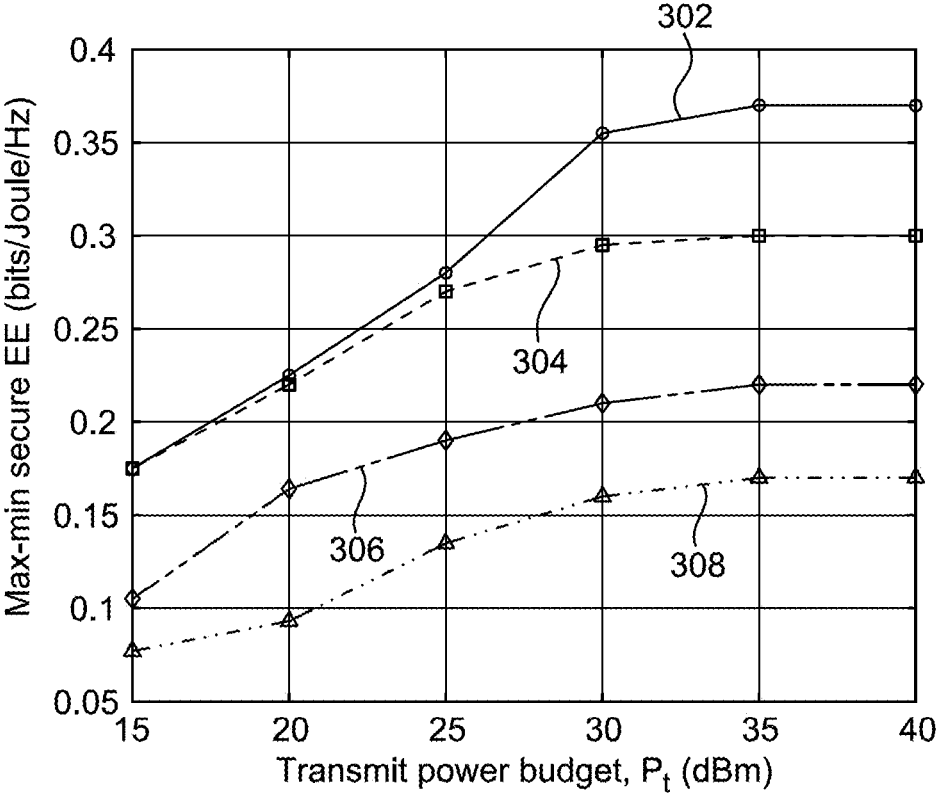
FIG. 3 is a schematic diagram illustrating the subproblem optimization flow within the block coordinate descent loop in the communication system according to some embodiments of the present disclosure.
FIG. 4 is a schematic diagram illustrating a cascaded TTD-based hybrid beamforming structure at a base station according to some embodiments of the present disclosure.

FIG. 3 illustrates a graphical representation of the maximum minimum (max-min) secure energy efficiency (EE), expressed in bits per Joule per Hertz, as a function of the transmit power budget Pt in decibel-milliwatts (dBm), according to certain embodiments. The figure compares the secure EE performance of four different system configurations under varying Pt values ranging from 15 dBm to 40 dBm.

Curve 302 represents the proposed STAR-RIS-assisted wideband THz communication system employing true time delay (TTD)-based hybrid beamforming. This configuration demonstrates the highest secure EE across the entire transmit power range. The secure EE steadily increases with Pt, eventually reaching saturation, indicating that beyond a certain transmit power level, additional power does not further enhance the worst-case user's energy efficiency.

Curve 304 corresponds to a fully-digital beamforming (FDB) approach wherein the number of radio frequency (RF) chains equals the number of transmit antennas. Although FDB benefits from high beamforming precision, the increased hardware complexity and elevated power consumption result in comparatively lower EE, particularly at higher Pt values.

Curve 306 illustrates the performance of a conventional hybrid beamforming (HB) system that does not employ TTD units. In this configuration, all subcarriers share a common analog beamformer, leading to frequency-independent beamforming and the emergence of beam-splitting effects. These impairments reduce the achievable secrecy rate, thereby lowering secure EE relative to both the proposed and FDB configurations.

Curve 308 represents a conventional reconfigurable intelligent surface (RIS) configuration where two separate RIS arrays, each having N/2 elements, are deployed side-by-side for transmission and reflection. This architecture exhibits the lowest secure EE performance across all transmit power levels due to suboptimal spatial coverage and the lack of integrated signal reuse via STAR functionality.

The simulation scenario assumes a user and eavesdropper distribution with three user equipment (UEs) and three eavesdroppers (EVs) located on the reflection side of the STAR-RIS, and one UE and one EV on the transmission side, collectively contributing to a heterogeneous user exposure condition.

FIG. 4 depicts the variation in max-min secure energy efficiency as a function of the number of antennas M at the base station (BS), according to certain embodiments. The four curves in the figure evaluate the impact of increasing antenna array size on secure EE for different system designs.

Curve 402 corresponds to the proposed STAR-RIS-aided system utilizing TTD-based hybrid beamforming with an energy-splitting protocol. As M increases from 96 to 160, a gradual decline in secure EE is observed, primarily due to increased power consumption associated with additional RF circuitry. Nonetheless, the proposed method retains its advantage over all benchmark techniques throughout the range of M.

Curve 404 denotes the fully-digital beamforming system, which also experiences a reduction in secure EE with growing antenna count, attributed to the linear scaling of RF chain power usage with MMM. Despite its digital precision, the FDB approach remains less efficient than the proposed method.

Curve 406 illustrates the performance of the conventional hybrid beamforming system without TTD integration. The lack of subcarrier-specific analog beamforming results in reduced secrecy performance, and the associated power consumption leads to a consistently lower EE than the proposed and FDB solutions.

Curve 408 represents the conventional RIS-based method using two RIS surfaces, each responsible for one transmission direction. Due to the reduced element count per direction and lack of unified beam control, this configuration performs the worst in terms of secure EE, particularly as the BS antenna count increases.

Figures 5, 6:
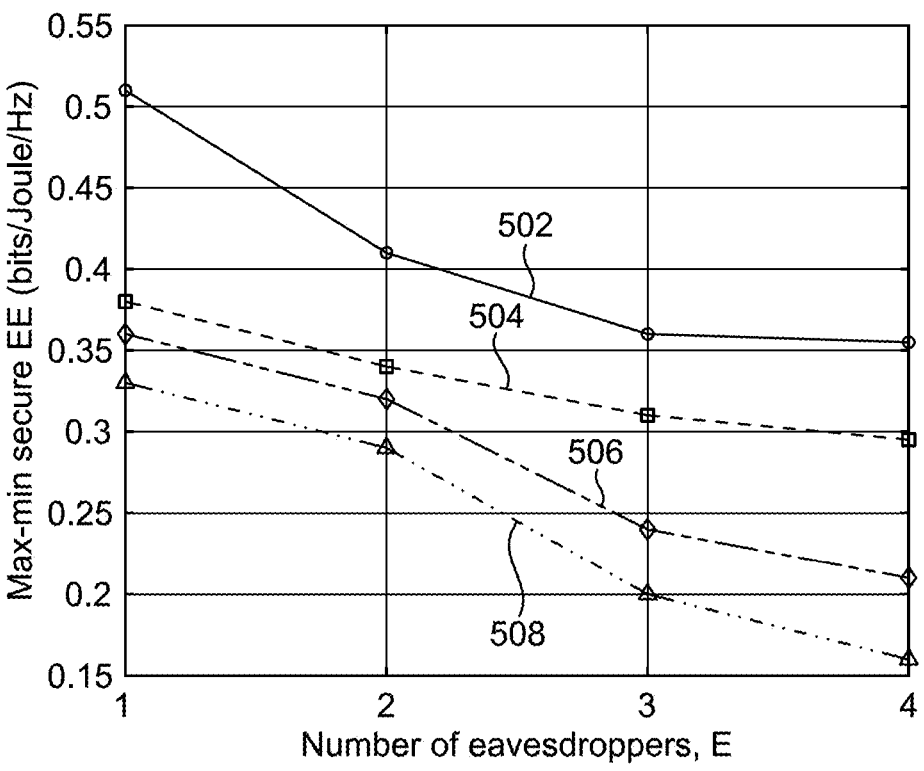
FIG. 5 is a graphical plot illustrating the max-min secure energy efficiency versus transmit power budget for different benchmark systems according to some embodiments of the present disclosure.
FIG. 6 is a graphical plot illustrating the max-min secure energy efficiency versus the number of eavesdroppers for different hybrid beamforming architectures according to some embodiments of the present disclosure.

FIG. 5 illustrates a graph plotting the max-min secure energy efficiency (EE), measured in bits per Joule per Hertz, against the number of eavesdroppers EEE. A first curve 502 corresponds to the proposed STAR-RIS-assisted hybrid beamforming solution, a second curve 504 represents the fully-digital beamforming configuration, a third curve 506 indicates the conventional hybrid beamforming approach, and a fourth curve 508 illustrates the conventional reconfigurable intelligent surface (RIS)-based system. As the number of eavesdroppers increases from 1 to 4, the max-min secure EE decreases across all configurations due to the increased likelihood of confidential user transmissions being overheard, which diminishes the secrecy rate.

The proposed solution 502 consistently outperforms all benchmarks, attributed to the joint STAR-RIS optimization and TTD-enabled hybrid beamforming that effectively suppresses eavesdropping and enhances security.

FIG. 6 illustrates a graph plotting the max-min secure energy efficiency (EE), measured in bits per Joule per Hertz, against channel state information (CSI) uncertainty 6. A first curve 602 represents the proposed solution, a second curve 604 corresponds to the fully-digital beamforming configuration, a third curve 606 denotes the conventional hybrid beamforming system, and a fourth curve 608 illustrates the performance of a conventional RIS-based implementation. CSI uncertainty is modeled by injecting estimation errors into the BS-to-RIS, RIS-to-UE, and RIS-to-eavesdropper channels, with the perturbation magnitude bounded by 6 times the estimated value. As the channel uncertainty increases, all configurations exhibit declining secure EE due to degraded beamforming precision and increased signal leakage. However, the proposed approach 602 remains superior across all 6 values due to its robust joint optimization framework that mitigates the impact of channel estimation errors.

Figure 7:
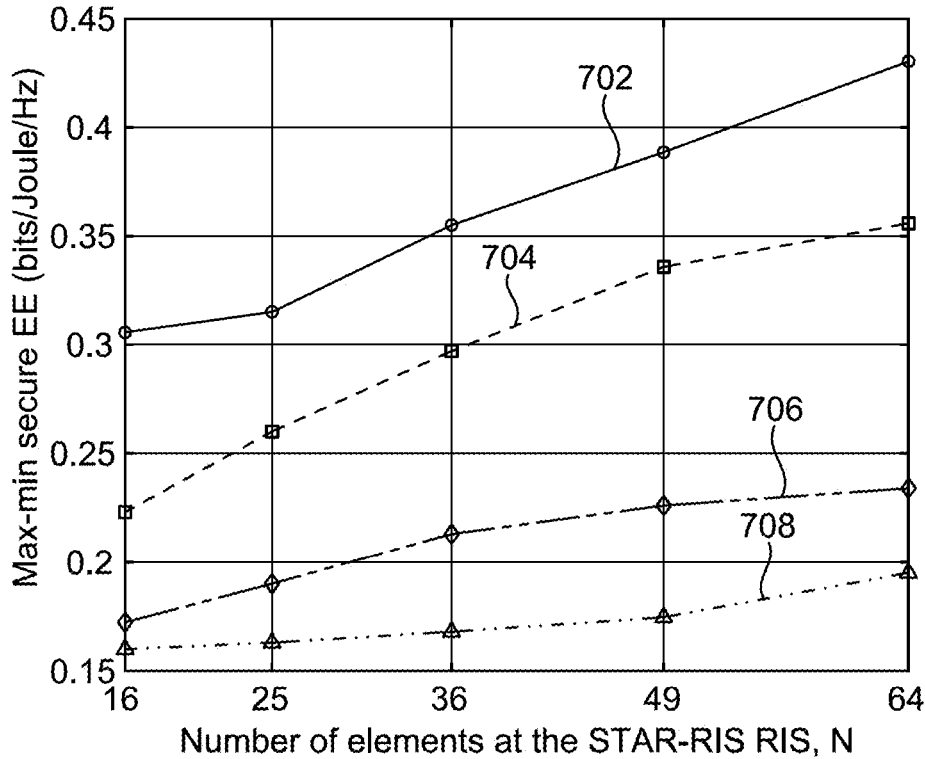
FIG. 7 is a graphical plot illustrating the impact of channel uncertainty on max-min secure energy efficiency across various optimization strategies according to some embodiments of the present disclosure.

FIG. 7 illustrates a graph showing the max-min secure energy efficiency (EE), measured in bits per Joule per Hertz, as a function of the number of elements N at the STAR-RIS. A first curve 702 corresponds to the proposed STAR-RIS-assisted hybrid beamforming solution, a second curve 704 denotes the fully-digital beamforming baseline, a third curve 706 represents conventional hybrid beamforming without TTD units, and a fourth curve 708 illustrates the conventional RIS-based implementation. As the number of STAR-RIS elements increases from 16 to 64, the max-min secure EE improves across all systems, primarily due to enhanced beamforming capability and increased spatial resolution. The proposed solution 702 demonstrates the steepest performance gain and highest overall secure EE, enabled by the synergy of STAR-RIS elements with energy-splitting capability and hybrid analog-digital processing with time-delay compensation.

Figure 8:
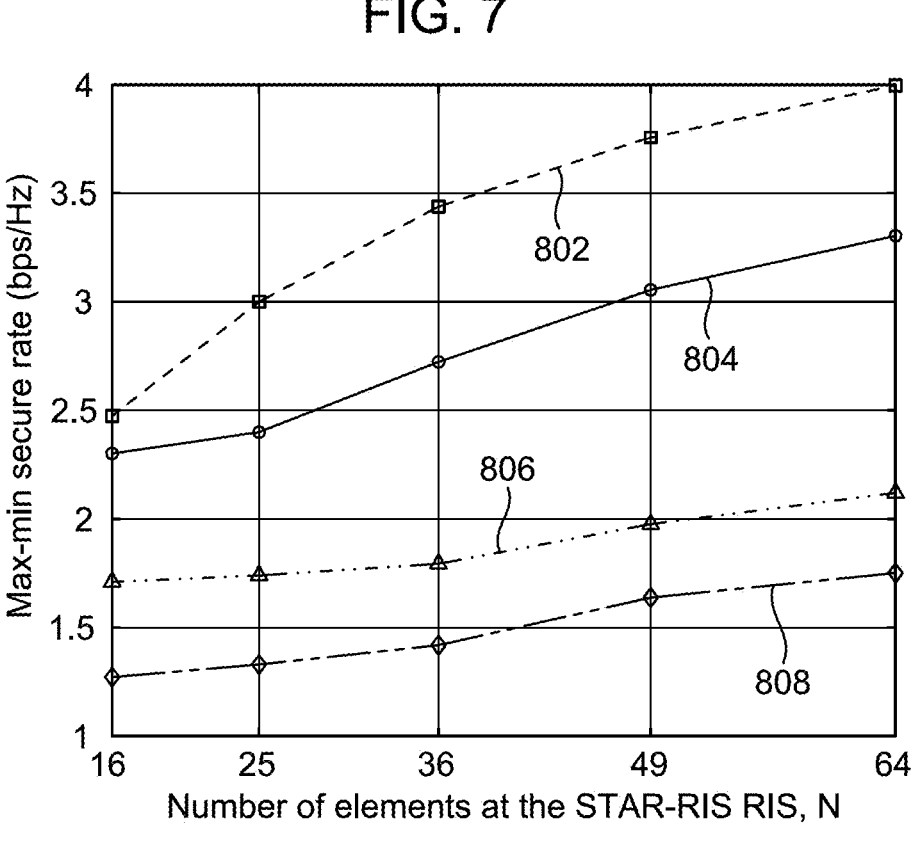
FIG. 8 is a graphical plot illustrating the effect of STAR-RIS element count on max-min secure energy efficiency for different beamforming schemes according to some embodiments of the present disclosure.

FIG. 8 illustrates a graph plotting the max-min secure rate, measured in bits per second per Hertz, against the number of elements N at the STAR-RIS. A first curve 802 represents the fully-digital beamforming solution, a second curve 804 corresponds to the proposed STAR-RIS-assisted hybrid beamforming configuration, a third curve 806 denotes the conventional RIS-based implementation, and a fourth curve 808 illustrates conventional hybrid beamforming.

Across all configurations, increasing N leads to improved secure rates due to higher aperture gain and finer phase control. The fully-digital beamforming solution 802 achieves the highest secure rate but at the expense of greater power consumption. The proposed solution 804 maintains a close second while offering a more favorable trade-off between security and energy efficiency. Conventional hybrid beamforming 808 and RIS-based implementations 806 offer lower performance due to the absence of joint optimization and TTD-enabled enhancements.

Figure 9:
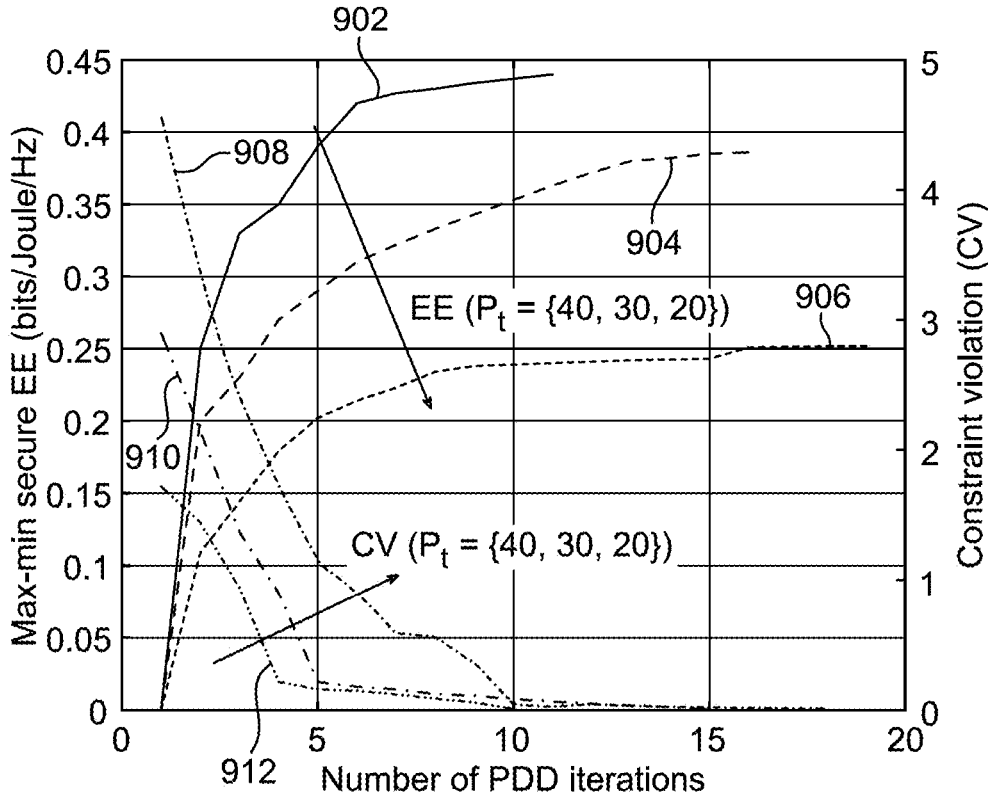
FIG. 9 is a graphical plot illustrating the convergence behavior of the proposed penalty dual decomposition algorithm across multiple transmit power levels according to some embodiments of the present disclosure.

FIG. 9 illustrates a convergence analysis of the proposed Algorithm 1 under varying transmit power budgets, denoted as Pt={20,30,40}dBm, as a function of the number of penalty dual decomposition (PDD) iterations. The plot comprises two performance metrics: the max-min secure energy efficiency (EE), indicated on the left vertical axis in units of bits per Joule per Hertz, and the constraint violation (CV), denoted on the right vertical axis in arbitrary units. The curve 902 represents the EE progression for Pt=40 dBm, showing a steep increase that saturates beyond approximately 8 iterations, reflecting rapid convergence. Curve 904 corresponds to Pt=30 dBm and exhibits a moderate growth pattern, while curve 906 indicates a slower convergence profile for Pt=20 dBm. Simultaneously, curves 908, 910, and 912 represent the CV behaviour for Pt=40, 30, and 20 dBm, respectively. All CV curves demonstrate a consistent monotonic decline, eventually approaching near-zero values, thereby indicating effective constraint satisfaction within approximately 10 to 15 iterations. The graphical trends confirm that the present embodiment achieves convergence and constraint feasibility efficiently across different transmit power scenarios.

Figure 10:
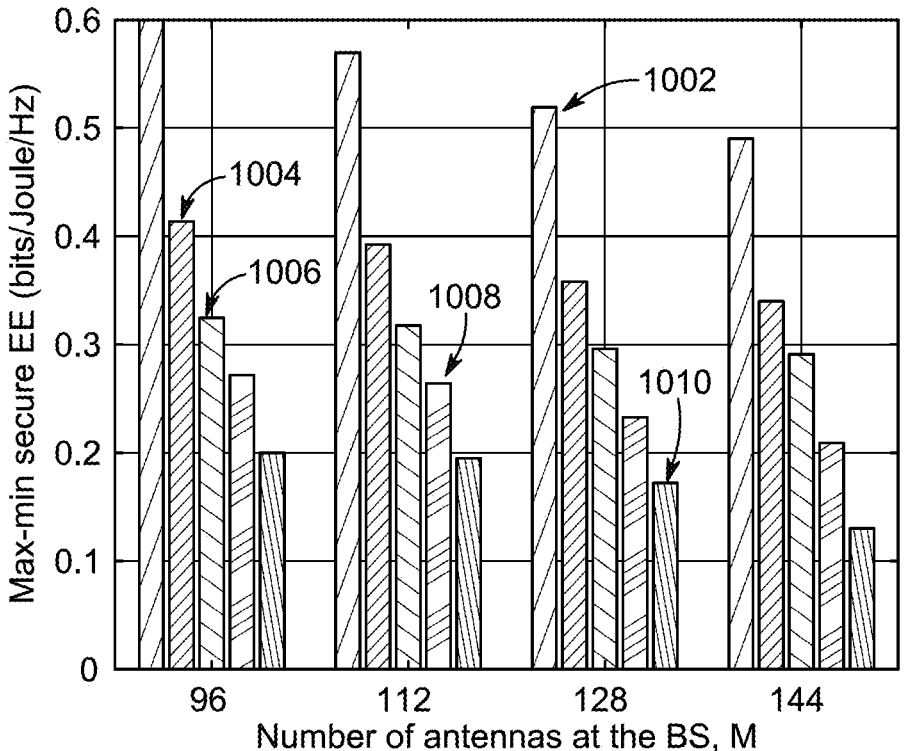
FIG. 10 is a graphical plot comparing max-min secure energy efficiency across different approaches with varying base station antenna counts according to some embodiments of the present disclosure.

FIG. 10 presents a comparative analysis of the max-min secure EE for different beamforming strategies and benchmark approaches as a function of the number of antennas M deployed at the base station (BS), with M∈{96,112,128, 144}. The bar 1002 represents the upper bound secure EE performance achieved in the absence of eavesdroppers (EVs), which serves as a theoretical reference for maximum efficiency. The bar 1004 denotes the hybrid beamforming approach with STAR-RIS and secure EE optimization, showing superior performance over state-of-the-art solutions under realistic adversarial constraints. The bar 1006 corresponds to the fully-digital beamforming (FDB) strategy, which performs sub-optimally due to high RF chain usage and associated power consumption. Bars 1008 represents an approach of Z. Wang et. al [*"Wideband beamforming for RIS assisted near-field communications,"* IEEE Trans. Wirel. Commn., pp. 1-1, 2024] and 1010 represents the approach reported in L. Xue et. al, [*"Max-min energy-efficiency fair optimization in STAR-RIS assisted communication system,"* IEEE Access, vol. 11, pp. 51106-51116, 2023], which is incorporated herein by reference in its entirety. Both prior approaches fall behind the present embodiment, primarily due to their disregard for EV presence and reliance on power-intensive RF architectures. The present embodiment consistently achieves higher secure EE across all antenna configurations, affirming its efficacy in energy-constrained secure communication settings. The performance comparison is further substantiated by Table I, which summarizes the computational complexities and iterative performance of each method, confirming that the present embodiment achieves superior secure EE with competitive computational overhead.

the minimum secure energy efficiency (EE) of the system. The optimization is subject to a plurality of constraints, including a transmit power budget constraint, a unit-modulus constraint on analog beamforming, an energy conservation constraint applicable to the STAR-RIS, and a time-delay constraint imposed by true-time delay (TTD) units. The optimization problem is characterized by a non-convex fractional objective function and involves intricate coupling between optimization variables, thereby posing significant computational challenges.

To address these challenges, a penalty dual decomposition method has been employed. The method operates by solving a penalized version of the original objective function in an inner loop, while an outer loop is configured to update the associated dual variables and penalty factors. Within the inner loop, a block coordinate descent (BCD) approach has been applied to efficiently optimize a large number of interdependent variables across multiple subproblems.

Simulation results presented herein validate the superior worst-case secure energy efficiency performance of the disclosed system when compared against a range of benchmark techniques, including fully-digital beamforming (FDB), conventional hybrid beamforming (HB), and a baseline reconfigurable intelligent surface (RIS)-assisted scheme. Furthermore, the results highlight the technical advantage of the present embodiment over existing state-of-the-art methods that fail to incorporate the presence and impact of EVs, thereby underscoring the significance of the disclosed secure EE optimization framework for STAR-RIS-assisted near-field wideband THz communications under adversarial conditions.

The disclosed optimization framework and algorithmic methodology are further adaptable to active STAR-RIS implementations. Moreover, the disclosed principles may be extended to joint channel estimation and optimization scenarios within STAR-RIS-assisted near-field wideband THz communication systems.

Figure 11:
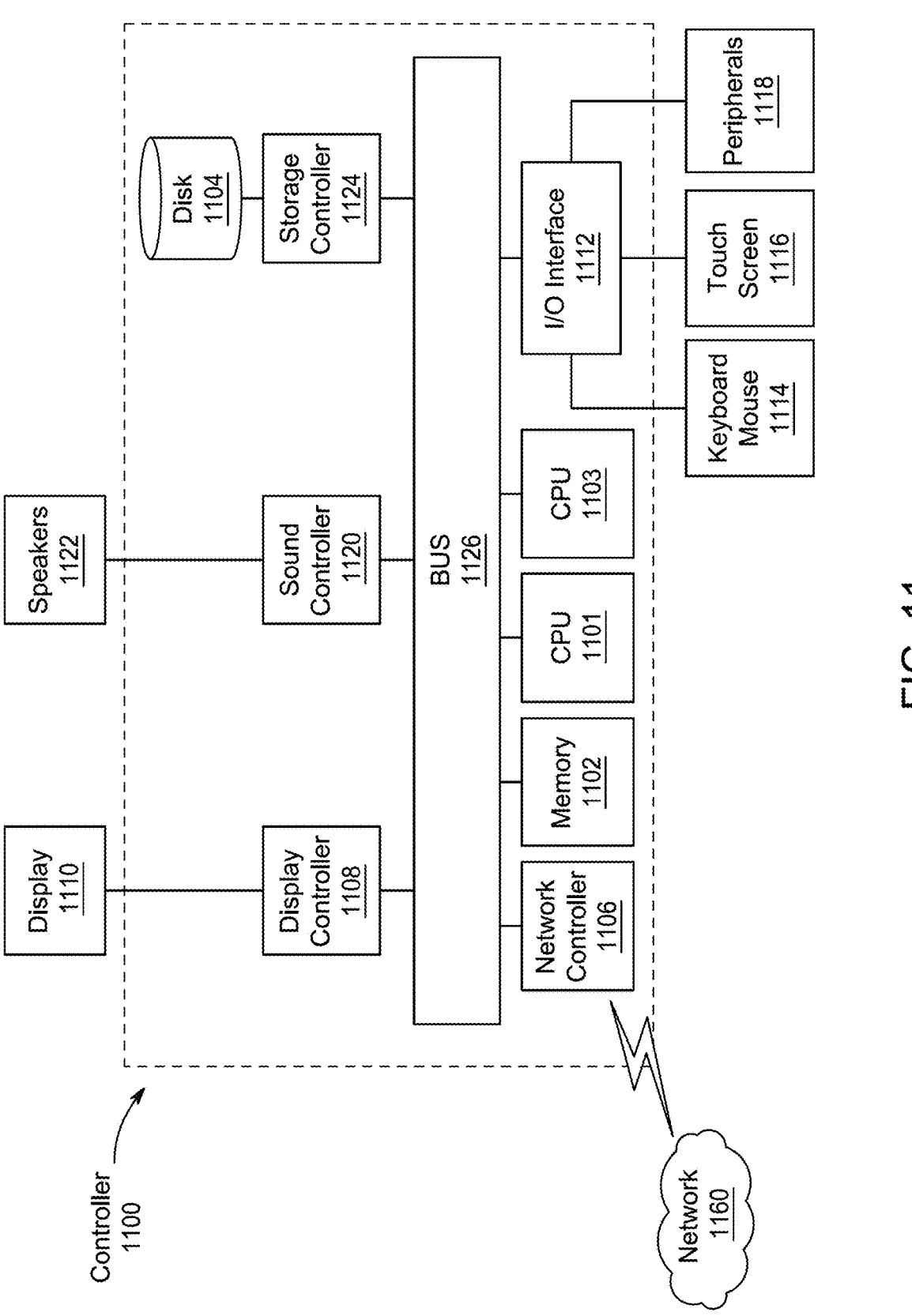
FIG. 11 is an illustration of a non-limiting example of details of computing hardware used in the computing system, according to certain embodiments.

Next, further details of the hardware description of the computing environment according to exemplary embodiments is described with reference to FIG. 11. In FIG. 11, a controller 1100 is described is representative of the system

TABLE I

| | | | | |
|---|---|---|---|---|
| Computational complexity of the approaches considered in FIG. 10 | | | | |
| Algorithm | Computational complexity (per-iteration) | Avg. # iter. (PDD loop) | Avg. # iter. (BCD loop) | Why existing approach falls behind the proposed algorithm |
| present embodiment | $O_1 + O_2 + O_3 + O_4 + O_5$ | 15.5 | 15.6 | — |
| FDB | $O_1 + O_2$ | 12.7 | 17.1 | Uses numerous RF chains, leading to high power consumption |
| Approach of Z. Wang | $O_1 + O_2 + O_3 + O_4 + O_5$ | 9.5 | 15.7 | Does not account for EVs |
| Approach of L Xue | $O_6 + O_7$ | — | 63.5 | Does not account for EVs and uses numerous RF chains, leading to high power consumption |

The present disclosure pertains to a simultaneously transmitting and reflecting reconfigurable intelligent surface (STAR-RIS)-assisted near-field wideband terahertz (THz) communication system incorporating multiple user equipment (UEs) and multiple eavesdroppers (EVs) deployed on both sides of the STAR-RIS. A practical optimization problem has been formulated with the objective of maximizing

100 of FIG. 1A in which the controller is a computing device which includes a CPU 1101 which performs the processes described above/below. The process data and instructions may be stored in memory 1102. These processes and instructions may also be stored on a storage medium disk 1104 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 1101, 1103 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 1101 or CPU 1103 may be a Xenon or Core processor from Intel of America or an Opteron processor from AMD of America, or may be other processor types that would be recognized by one of ordinary skill in the art. Alternatively, the CPU 1101, 1103 may be implemented on an FPGA, ASIC, PLD or using discrete logic circuits, as one of ordinary skill in the art would recognize. Further, CPU 1101, 1103 may be implemented as multiple processors cooperatively working in parallel to perform the instructions of the inventive processes described above.

The computing device in FIG. 11 also includes a network controller 1106, such as an Intel Ethernet PRO network interface card from Intel Corporation of America, for interfacing with network 1160. As can be appreciated, the network 1160 can be a public network, such as the Internet, or a private network such as an LAN or WAN network, or any combination thereof and can also include PSTN or ISDN sub-networks. The network 1160 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

A sound controller 1120 is also provided in the computing device such as Sound Blaster X-Fi Titanium from Creative, to interface with speakers/microphone 1122 thereby providing sounds and/or music.

The general purpose storage controller 1124 connects the storage medium disk 1104 with communication bus 1126, which may be an ISA, EISA, VESA, PCI, or similar, for interconnecting all of the components of the computing device. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 12.

Figure 12:
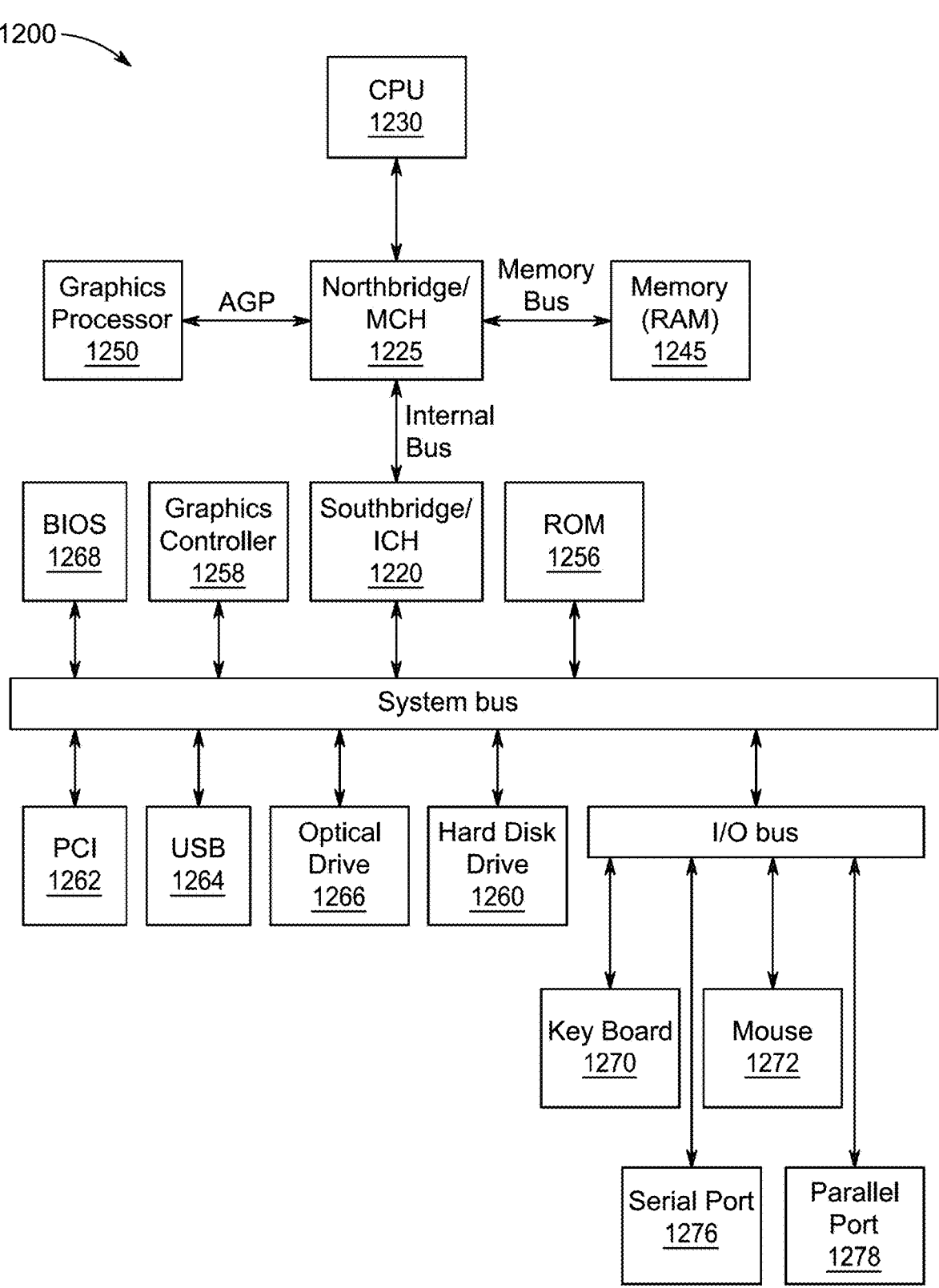
FIG. 12 is an exemplary schematic diagram of a data processing system used within the computing system, according to certain embodiments.

FIG. 12 shows a schematic diagram of a data processing system 1200, according to certain embodiments, for performing the functions of the exemplary embodiments. The data processing system is an example of a computer in which code or instructions implementing the processes of the illustrative embodiments may be located.

In FIG. 12, data processing system 1200 employs a hub architecture including a north bridge and memory controller hub (NB/MCH) 1225 and a south bridge and input/output (I/O) controller hub (SB/ICH) 1220. The central processing unit (CPU) 1230 is connected to NB/MCH 1225. The NB/MCH 1225 also connects to the memory 1245 via a memory bus, and connects to the graphics processor 1250 via an accelerated graphics port (AGP). The NB/MCH 1225 also connects to the SB/ICH 1220 via an internal bus (e.g., a unified media interface or a direct media interface). The CPU Processing unit 1230 may contain one or more processors and even may be implemented using one or more heterogeneous processor systems.

Figure 13:
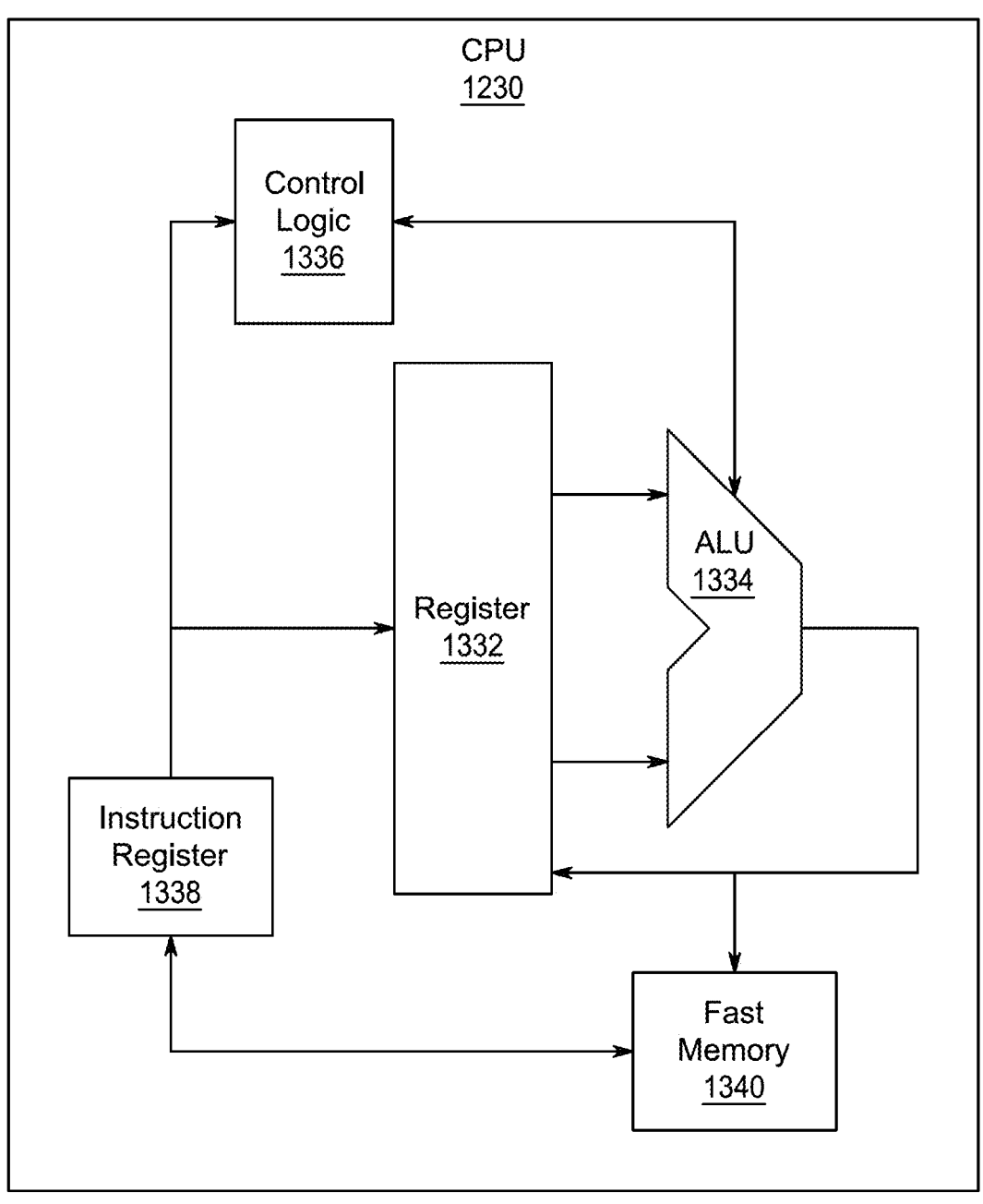
FIG. 13 is an exemplary schematic diagram of a processor used with the computing system, according to certain embodiments.

For example, FIG. 13 shows one implementation of CPU 1230. In one implementation, the instruction register 1338 retrieves instructions from the fast memory 1340. At least part of these instructions are fetched from the instruction register 1338 by the control logic 1336 and interpreted according to the instruction set architecture of the CPU 1230. Part of the instructions can also be directed to the register 1332. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1334 that loads values from the register 1332 and performs logical and mathematical operations on the loaded values according to the instructions. The results from these operations can be feedback into the register and/or stored in the fast memory 1340. According to certain implementations, the instruction set architecture of the CPU 1230 can use a reduced instruction set architecture, a complex instruction set architecture, a vector processor architecture, a very large instruction word architecture. Furthermore, the CPU 1230 can be based on the Von Neuman model or the Harvard model. The CPU 1230 can be a digital signal processor, an FPGA, an ASIC, a PLA, a PLD, or a CPLD. Further, the CPU 1230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 12, the data processing system 1200 can include that the SB/ICH 1220 is coupled through a system bus to an I/O Bus, a read only memory (ROM) 1256, universal serial bus (USB) port 1264, a flash binary input/output system (BIOS) 1268, and a graphics controller 1258. PCI/PCIe devices can also be coupled to SB/ICH 1220 through a PCI bus 1262.

The PCI devices may include, for example, Ethernet adapters, add-in cards, and PC cards for notebook computers. The Hard disk drive 1260 and CD-ROM 1266 can use, for example, an integrated drive electronics (IDE) or serial advanced technology attachment (SATA) interface. In one implementation the I/O bus can include a super I/O (SIO) device.

Further, the hard disk drive (HDD) 1260 and optical drive 1266 can also be coupled to the SB/ICH 1220 through a system bus. In one implementation, a keyboard 1270, a mouse 1272, a parallel port 1278, and a serial port 1276 can be connected to the system bus through the I/O bus. Other peripherals and devices that can be connected to the SB/ICH 1220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 14:
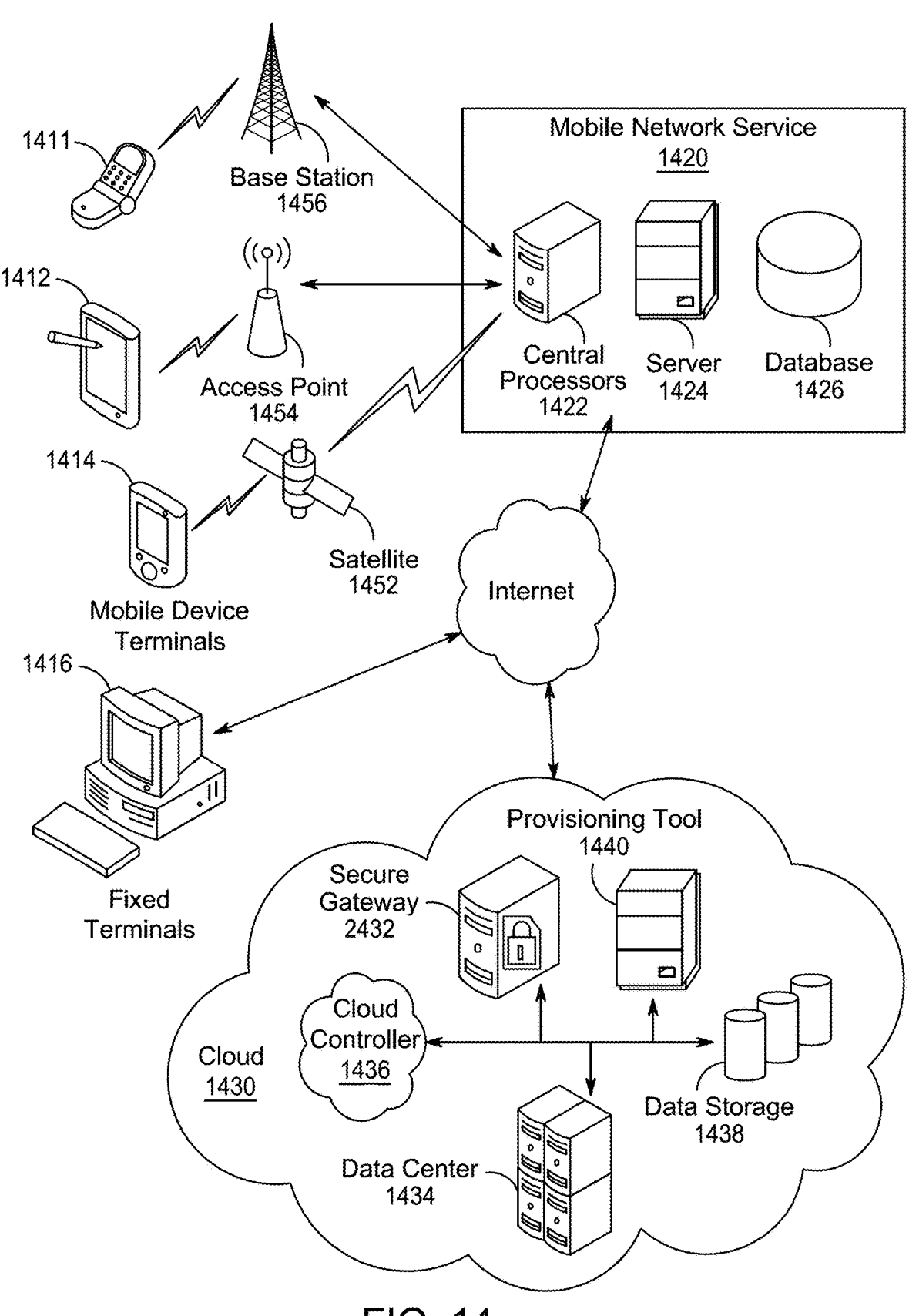
FIG. 14 is an illustration of a non-limiting example of distributed components which may share processing with the controller, according to certain embodiments

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 14, in addition to various human interface and communication devices (e.g., display monitors, smart phones, tablets, personal digital assistants (PDAs)). More specifically, FIG. 14 illustrates client devices including a smart phone 1411, a tablet 1412, a mobile device terminal 1414 and fixed terminals 1416. These client devices may be commutatively coupled with a mobile network service 1420 via a base station 1456, an access point 1454, a satellite 1452 or via an internet connection. The mobile network service 1420 may comprise central processors 1422, a server 1424 and a database 1426. The fixed terminals 1416 and the mobile network service 1420 may be commutatively coupled via an internet connection to functions in cloud 1430 that may comprise a security gateway 1432, a data center 1434, a cloud controller 1436, a data storage 1438 and a provisioning tool 1440. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

Although techniques using, and systems including, Max-Min secure energy efficiency optimization have been described in language specific to features and/or methods, it is to be understood that the subject of the appended claims is not necessarily limited to the specific features or methods described. Rather, the specific features and methods are disclosed as example implementations of Max-Min secure energy efficiency optimization.

Some Examples include any combinations of the following: Example 1. A method for maximizing a minimum secure energy efficiency (EE) of a simultaneous transmitting and reflecting (STAR)-reflective intelligent surface (RIS)-assisted near-field orthogonal frequency division multiplexing (OFDM)-based wideband terahertz (THz) communication system that includes an M-antenna base station (BS) with a uniform linear array (ULA), a STAR-RIS equipped with $N=N_1 \times N_2$ reflective elements with a uniform planar array (UPA) structure, U single-antenna user equipment (UEs) and E single-antenna eavesdroppers (EVs), wherein a passive antenna array that adopts a true time delayers (TTDs)-based hybrid beamforming structure is installed at the BS, the TTDs-based hybrid beamforming structure includes $M_{RF}$ radio frequency (RF) chains each connected to M phase shifters (PSs) through $M_T$ TTD units, an energy-splitting protocol for the STAR-RIS and TTD-based hybrid beamforming is employed at the BS, the UEs and the EVs are on reflection and transmission sides of the STAR-RIS, a distance between the BS and the STAR-RIS is shorter than their Rayleigh distance, the method comprising:

maximizing a minimum secure energy efficiency (EE) subject to a total transmit power budget, unit-modulus of analog beamforming of the TTDs-based hybrid beamforming structure, energy conservation in the STAR-RIS, and time-delay of the TTD units; and controlling the BS, a digital baseband processing, each RF chain, each TTD, each PS, the STAR-RIS and a circuit of each UE to operate according to the maximized minimum secure EE.

Example 2. The method of example 1, wherein maximizing the minimum secure EE is performed subject to constraints that include $$\left\| W^{PS} D_k W_k^D \right\|_F^2 \le P_t, \forall k \in \mathcal{K},$$

which indicates that transmit power across all subcarriers is bounded by the total transmit power budget, which is denoted by $$P_t, \left| \left[ w_{p,q}^{PS} \right]_r \right| = 1, \forall p \in \mathcal{P}, q \in Q, r \in \mathcal{R},$$

which enforces a unit-modulus constraint of the PSs-based analog beamforming, $$\rho_{t,n}^2 + \rho_{r,n}^2 = 1, \forall n \in \mathcal{N},$$

represents an energy conservation constraint of the STAR-RIS, where a law of energy conservation is satisfied as energy of a signal incident on each reflective element splits into energies of transmitted and reflected signals according to energy-splitting ratios of $$\rho_{t,n}^2 : \rho_{r,n}^2, \rho_{v,n} \in [0, 1], \phi_{v,n} \in [0, 2\pi], \forall v \in \{t, r\}, n \in \mathcal{N},$$

which addresses amplitude and phase constraints of transmission/reflection coefficients of the STAR-RIS, and $d_{p,q} \ge 0$, $\forall p \in \mathcal{P}, q \in Q$, which refers to time-delay constraints of the TTDs.

Example 3. The method of example 2, wherein maximizing the minimum secure EE is transformed to $$\max_{\substack{x,\ell,W_k,W_k^D,\bar{r}_{k,\dots,r_{k,*}^{\theta_r,D_k,z_{k,u},z_{k,e}}}^{W^{PS},\theta_t,}}} x - \mathcal{L}(W, W^{PS}, D_k, W^D, z_{k,u}, z_{k,e}, \theta_t, \theta_r),$$

where $\ell(W, W^{PS}, D_k, W^D, z_{k,u}, \bar{z}_{k,e}, \theta_t, \theta_r)$ is an augmented Lagrangian factor that is equal to $$\sum_k \frac{1}{2\zeta} \|W_k - W^{PS} D_k W_k^D + \zeta\Lambda_k\|_F^2 +$$

$$\sum_{k,u,v} \frac{1}{2\zeta} \|z_{k,u} - \theta_v^T G_{k,u} W_k + \zeta\tau_{k,u}\|^2 + \sum_{k,e,v} \frac{1}{2\zeta} \|z_{k,e} - \theta_v^T \bar{G}_{k,e} W_k + \zeta\bar{\tau}_{k,e}\|^2,$$

where $\zeta \geq 0$ represents a penalty factor of a penalty dual decomposition (PDD) process, $$W_k^D$$

represents digital beamforming of the TTDs-based hybrid beamforming structure, $W^{PS}$ represents the PSs-based analog beamforming, $D_k$ represents matrices of the TTDs, $$z_{v,u} = \theta_v^T G_{k,u} W_k, \forall k \in \mathcal{K}, u \in \mathcal{U}_v, v \in \{t, r\}.$$

where $G_{k,u}$ represents a cascaded channel from the BS to the STAR-RIS to a u-th UE at a k-th subcarrier, $$\bar{z}_{k,e} = \theta_v^T \bar{G}_{k,e} W_k, \forall k \in \mathcal{K}, e \in \mathcal{E}_v, v \in \{t, r\},$$

where $G_{k,e}$ represents a cascaded channel from the BS to the STAR-RIS to an e-th EV at the k-th subcarrier, and $\theta_t$ and $\theta_r$ represent transmission and reflection coefficients of the STAR-RIS, respectively, $$r_{k,u}(z_{k,u}) = \ln\left(1 + \frac{|z_{k,u,u}|^2}{\sum_{i\in U, i\neq u} |z_{k,u,i}|^2 + \sigma_{k,u}^2}\right), \text{ and}$$

$$\bar{r}_{k,e,u}(z_{k,e}) = \ln\left(1 + \frac{|z_{k,e,u}|^2}{\sum_{i\in U, i\neq u} |\bar{z}_{k,e,i}|^2 + \bar{\sigma}_{k,e}^2}\right).$$

Example 4. The method of example 3, wherein a block coordinate descent (BCD) process is employed to solve $$\max_{x,\ell,o,W_k,W_k^D,\bar{r}_{k,\dots,r_{k,u},W^{pr},\theta_t,\theta_r,D_k,z_{k,u},z_{k,e}}} x -$$

$$\mathcal{L}(W, W^{PS}, D_k, W^D, Z_{k,u}, \bar{z}_{k,e}, \theta_t, \theta_r).$$

Example 5. The method of example 4, wherein the BCD process solves $$\max_{x,\ell,o,W_k,W_k^P,\bar{r}_{k,\dots,r_{k,u},W^{pr},\theta_t,\theta_r,D_k,z_{k,u},z_{k,e}}} x -$$

$$\mathcal{L}(W, W^{PS}, D_k, W^D, Z_{k,u}, \bar{z}_{k,e}, \theta_t, \theta_r)$$

by determining $\{W_k, z_{k,u}, \bar{z}_{k,e}, X, \ell, o, r_{k,u}, \bar{r}_{e,u}\}, \{\theta_t, \theta_r\}, W^{PS},$ $$W_k^D$$

and $D_k$ iteratively.

Example 6. The method of example 5, wherein while $\{\theta_t, \theta_r\}, W^{PS},$ $$W_k^D$$

and $D_k$ are kept fixed, $\{W_k, z_{k,u}, \bar{z}_{k,e}, X, \ell, o, r_{k,u}, \bar{r}_{k,e,u}\}$ is determined according to $$\max_{\substack{x,\ell,o\\W_k,\tau_{k,n,u},r_{k,u}\\z_{k,u},z_{k,e}}} x - \sum_k \frac{1}{2\zeta} \|W_k - W^{PS} D_k W_k^D + \zeta\Lambda_k\|_F^2 -$$

$$\sum_{k,u,v} \frac{1}{2\zeta} \|z_{k,u} - \theta_v^T G_{k,u} W_k + \zeta\tau_{k,u}\|^2 - \sum_{k,e,v} \frac{1}{2\zeta} \|z_{k,e} - \theta_v^T \bar{G}_{k,e} W_k + \zeta\bar{\tau}_{k,e}\|^2,$$

such that $X \leq \frac{\ell_u^2}{o_u}, \forall u \in \mathcal{U}, \ell_u^2 \leq \xi\left(\sum_{k\in\mathcal{K}} r_{k,u} - \sum_{k\in\mathcal{K}} \bar{r}_{k,e,u}\right),$ $$\forall u \in \mathcal{U}, e \in \mathcal{E}, o_u \geq \frac{1}{UK}\sum_{k\in\mathcal{K}} \|W_k\|_F^2 + \mu\xi \sum_{k\in\mathcal{K}} r_{k,u} + \frac{P_c}{U},$$

$$\forall u \in \mathcal{U}, \|W_k\|_F^2 \leq P_t, \forall k \in \mathcal{K}, r_{k,u} \leq r_{k,u}(z_{k,u}),$$

$$\forall u \in \mathcal{U}, k \in \mathcal{K}, \bar{r}_{k,e,u} \geq \bar{r}_{k,e,u}(\bar{z}_{k,e}), \forall u \in \mathcal{U}, k \in \mathcal{K}, e \in \mathcal{E}.$$

Example 7. The method of example 5, wherein while $\{W_k, z_{k,u}, \bar{z}_{k,e}, X, \ell, o, r_{k,u}, \bar{r}_{k,e,u}\}, W^{PS},$ $$W_k^D$$

and $D_k$ are kept fixed, $\{\theta_t, \theta_r\}$ is determined according to $$\min_{\theta_t,\theta_r} \sum_{k,u,v} \|z_{k,u} - \theta_v^T G_{k,u} W_k + \zeta\tau_{k,u}\|^2 + \sum_{k,e,v} \|z_{k,e} - \theta_v^T \bar{G}_{k,e} W_k + \zeta\bar{\tau}_{k,e}\|^2,$$

such that $\rho_{t,n}^2 + \rho_{r,n}^2 = 1, \forall n \in \mathcal{N}, \text{ and}$ $$\rho_{v,n} \in [0, 1], \phi_{v,n} \in [0, 2\pi], \forall v \in \{t, r\}, n \in \mathcal{N}$$

Example 8. The method of example 5, wherein while $\{W_k, z_{k,u}, \bar{z}_{k,e}, X, \ell, o, r_{k,u}, \bar{r}_{k,e,u}\}, \{\theta_t, \theta_r\},$ $$W_k^D$$

and $D_k$ are kept fixed, $W^{PS}$ is determined $$\min_{W^{PS}} \sum_k \left\| W_k - W^{PS} D_k W_k^D + \zeta \Lambda_k \right\|_F^2,$$

$$\text{such that } \left| \left[ w_{p,q}^{PS} \right]_r \right| = 1, \forall\, p \in \mathcal{P}, q \in Q, r \in \mathcal{R}.$$

Example 9. The method of example 5, wherein while $\{W_k, z_{k,u}, \bar{z}_{k,e}, X, \ell, o, r_{k,u}, \bar{r}_{k,e,u}\}, \{\theta_t, \theta_r\}, W^{PS}$ and $D_k$ are kept fixed, $$W_k^D$$

is determined according to $$\min_{W_k^D, \forall k \in \mathcal{K}} \sum_k \left\| W_k - W^{PS} D_k W_k^D + \xi \Lambda_k \right\|_F^2, \text{ and}$$

$$W_k^D = \left( \left( W_k^{PS} D_k \right)^H \left( W_k^{PS} D_k \right) \right)^{-1} \left( W_k^{PS} D_k \right)^H \times (W_k + \zeta \Lambda_k), \forall\, k \in \mathcal{K}.$$

Example 10. The method of example 5, wherein while $\{W_k, z_{k,u}, \bar{z}_{k,e}, X, \ell, o, r_{k,u}, \bar{r}_{k,e,u}\}, \{\theta_t, \theta_r\}, W^{PS}$ and $$W_k^D$$

are kept fixed, $D_k$ is determined according to $$\min_{D_k} \sum_k \left\| W_k - W^{PS} D_k W_k^D + \zeta \Lambda_k \right\|_F^2,$$

such that $d_{p,q} \geq 0, \forall p \in \mathcal{P}, q \in Q$.

Example 11. A system for maximizing a minimum secure energy efficiency (EE) of a simultaneous transmitting and reflecting (STAR)-reflective intelligent surface (RIS)-assisted near-field orthogonal frequency division multiplexing (OFDM)-based wideband terahertz (THz) communication system that includes an M-antenna base station (BS) with a uniform linear array (ULA), a STAR-RIS equipped with $N=N_1 \times N_2$ reflective elements with a uniform planar array (UPA) structure, U single-antenna user equipment (UEs) and E single-antenna eavesdroppers (EVs), wherein a passive antenna array that adopts a true time delayers (TTDs)-based hybrid beamforming structure is installed at the BS, the TTDs-based hybrid beamforming structure includes $M_{RF}$ radio frequency (RF) chains each connected to M phase shifters (PSs) through $M_T$ TTD units, an energy-splitting protocol for the STAR-RIS and TTD-based hybrid beamforming is employed at the BS, the UEs and the EVs are on reflection and transmission sides of the STAR-RIS, a distance between the BS and the STAR-RIS is shorter than their Rayleigh distance, the method comprising circuitry configured to:

maximize a minimum secure energy efficiency (EE) subject to a total transmit power budget, unit-modulus of analog beamforming of the TTDs-based hybrid beamforming structure, energy conservation in the STAR-RIS, and time-delay of the TTD units; and control the BS, a digital baseband processing, each RF chain, each TTD, each PS, the STAR-RIS and a circuit of each UE to operate according to the maximized minimum secure EE.

Example 12. The system of example 11, wherein the circuitry maximizes the minimum secure EE by maximizing the minimum secure EE subject to constraints that include $$\left\| W^{PS} D_k W_k^D \right\|_F^2 \leq P_t, \forall\, k \in \mathcal{K},$$

which indicates that transmit power across all subcarriers is bounded by the total transmit power budget, which is denoted by $$P_t, \left| \left[ w_{p,q}^{PS} \right]_r \right| = 1, \forall\, p \in \mathcal{P}, q \in Q, r \in \mathcal{R},$$

which enforces a unit-modulus constraint of the PSs-based analog beamforming, $$\rho_{t,n}^2 + \rho_{r,n}^2 = 1, \forall\, n \in \mathcal{N},$$

which represents an energy conservation constraint of the STAR-RIS, where a law of energy conservation is satisfied as energy of a signal incident on each reflective element splits into energies of transmitted and reflected signals according to energy-splitting ratios of $$\rho_{t,n}^2 : \rho_{r,n}^2, \rho_{v,n} \in [0, 1], \phi_{v,n} \in [0, 2\pi], \forall\, v \in \{t, r\}, n \in \mathcal{N},$$

which addresses amplitude and phase constraints of transmission/reflection coefficients of the STAR-RIS, and $d_{p,q} \geq 0$, $\forall p \in \mathcal{P}$, $q \in Q$, which refers to time-delay constraints of the TTDs.

Example 13. The system of example 12, wherein the circuitry maximizes the minimum secure EE by $$\max_{\substack{x, \ell, W_k, W_k^D, r_{k,\ldots}, r_{k,*}, W^{PS}, \theta_t, \\ \theta_r, D_k, z_{k,u}, z_{k,e}}} x - \mathcal{L}\left( W, W^{PS}, D_k, W^D, z_{k,u}, \bar{z}_{k,e}, \theta_t, \theta_r \right),$$

where $\mathcal{L}$ (W, $W^{PS}$, $D_k$, $W^D$, $z_{k,u}$, $\bar{z}_{k,e}$, $\theta_t$, $\theta_r$) is an augmented Lagrangian factor that is equal to $$\sum_k \frac{1}{2\zeta} \left\| W_k - W^{PS} D_k W_k^D + \zeta \Lambda_k \right\|_F^2 +$$

$$\sum_{k,u,v} \frac{1}{2\zeta} \left\| z_{k,u} - \theta_v^T G_{k,u} W_k + \zeta \tau_{k,u} \right\|^2 + \sum_{k,e,v} \frac{1}{2\zeta} \left\| \bar{z}_{k,e} - \theta_v^T \overline{G}_{k,e} W_k + \zeta \overline{\tau}_{k,e} \right\|^2,$$

where $\zeta \geq 0$ represents a penalty factor of a penalty dual decomposition (PDD) process, $$W_k^D$$

represents digital beamforming of the TTDs-based hybrid beamforming structure, $W^{PS}$ represents the PSs-based analog beamforming, $D_k$ represents matrices of the TTDs, $$z_{k,u} = \theta_v^T G_{k,u} W_k, \forall k \in \mathcal{K}, u \in \mathcal{U}_v, v \in \{t, r\},$$

where $G_{k,u}$ represents a cascaded channel from the BS to the STAR-RIS to a u-th UE at a k-th subcarrier, $$\bar{z}_{k,e} = \theta_v^T \overline{G}_{k,e} W_k, \forall k \in \mathcal{K}, e \in \mathcal{E}_v, v \in \{t, r\},$$

where $\overline{G}_{k,e}$ represents a cascaded channel from the BS to the STAR-RIS to an e-th EV at the k-th subcarrier, and $\theta_t$ and $\theta_r$ represent transmission and reflection coefficients of the STAR-RIS, respectively, $$r_{k,u}(z_{k,u}) = \ln\left(1 + \frac{|z_{k,u,u}|^2}{\sum_{i \in U, i \neq u} |z_{k,u,i}|^2 + \sigma_{k,u}^2}\right),$$

$$\text{and } \bar{r}_{k,e,u}(\bar{z}_{k,e}) = \ln\left(1 + \frac{|\bar{z}_{k,e,u}|^2}{\sum_{i \in U, i \neq u} |\bar{z}_{k,e,i}|^2 + \overline{\sigma}_{k,e}^2}\right).$$

Example 14. The system of example 13, wherein the circuitry employs a block coordinate descent (BCD) process to solve $$\max_{x,\ell,0,W_k W_k^D \mathcal{I}_{k,\ldots},r_{k,u},W^{pr},\theta_t,\theta_r,D_k,z_{k,u},\bar{z}_{k,e}} x -$$

$$\mathcal{L}(W, W^{PS}, D_k, W^D, z_{k,u}, \bar{z}_{k,e}, \theta_t, \theta_r).$$

Example 15. The system of example 14, wherein the BCD process solves $$\max_{x,\ell,0,W_k W_k^D \mathcal{I}_{k,\ldots},r_{k,u},W^{pr},\theta_t,\theta_r,D_k,z_{k,u},\bar{z}_{k,e}} x -$$

$$\mathcal{L}(W, W^{PS}, D_k, W^D, z_{k,u}, \bar{z}_{k,e}, \theta_t, \theta_r)$$

by determining $\{W_k, z_{k,u}, \bar{z}_{k,e}, X, \ell, o, r_{k,u}, \bar{r}_{e,u}\}, \{\theta_t, \theta_r\}, W^{PS},$ $$W_k^D$$

and $D_k$ iteratively.

Example 16. The system of example 15, wherein while $\{\theta_t, \theta_r\}, W^{PS},$ $$W_k^D$$

and $D_k$ are kept fixed, $\{W_k, z_{k,u}, \bar{z}_{k,e}, X, \boldsymbol{\ell}, o, r_{k,u}, \bar{r}_{k,e,u}\}$ is determined according to $$\max_{\substack{x,\ell,o \\ W_k,\tau_{k,n,u},r_{k,u} \\ z_{k,u},z_{k,e}}} x - \sum_k \frac{1}{2\zeta}\left\|W_k - W^{PS}D_k W_k^D + \zeta\Lambda_k\right\|_F^2 -$$

$$\sum_{k,u,v} \frac{1}{2\zeta}\left\|z_{k,u} - \theta_v^T G_{k,u} W_k + \zeta\tau_{k,u}\right\|^2 - \sum_{k,e,v} \frac{1}{2\zeta}\left\|\bar{z}_{k,e} - \theta_v^T \overline{G}_{k,e} W_k + \zeta\overline{\tau}_{k,e}\right\|^2,$$

$$\text{such that } \chi \leq \frac{\ell_u^2}{o_u}, \forall u \in \mathcal{U}, \ell_u^2 \leq \xi\left(\sum_{k \in \mathcal{K}} r_{k,u} - \sum_{k \in \mathcal{K}} \bar{r}_{k,e,u}\right),$$

$$\forall u \in \mathcal{U}, e \in \mathcal{E}, \,^{o_u} \geq \frac{1}{UK}\sum_{k \in \mathcal{K}} \|W_k\|_F^2 + \mu\xi\sum_{k \in \mathcal{K}} r_{k,u} + \frac{P_c}{u},$$

$$\forall u \in \mathcal{U}, \|W_k\|_F^2 \leq P_t, \forall k \in \mathcal{K}, r_{k,u} \leq r_{k,u}(z_{k,u}), \forall u \in \mathcal{U},$$

$$k \in \mathcal{K}, \bar{r}_{k,e,u} \geq \bar{r}_{k,e,u}(\bar{z}_{k,e}), \forall u \in \mathcal{U}, k \in \mathcal{K}, e \in \mathcal{E}.$$

Example 17. The system of example 15, wherein while $\{W_k, z_{k,u}, \bar{z}_{k,e}, X, \ell, o, r_{k,u}, \bar{r}_{k,e,u}\}W^{PS},$ $$W_k^D$$

and $D_k$ are kept fixed, $\{\theta_t, \theta_r\}$ is determined according to $$\min_{\theta_t \theta_r}\sum_{k,u,v} \left\|z_{k,u} - \theta_v^T G_{k,u} W_k + \zeta\tau_{k,u}\right\|^2 + \sum_{k,e,v}\left\|\bar{z}_{k,e} - \theta_v^T \overline{G}_{k,e} W_k + \zeta\overline{\tau}_{k,e}\right\|^2,$$

such that $$\rho_{t,n}^2 + \rho_{r,n}^2 = 1, \forall n \in \mathcal{N},$$

and $\rho_{v,n} \in [0,1], \phi_{v,n} \in [0,2\pi], \forall v \in \{t, r\}, n \in \mathcal{N}$ Example 18. The system of example 15, wherein while $\{W_k, z_{k,u}, \bar{z}_{k,e}, X, \ell, o, r_{k,u}, \bar{r}_{k,e,u}\}, \{\theta_t, \theta_r\},$ $$W_k^D$$

and $D_k$ are kept fixed, $W^{PS}$ is determined according to $$\min_{W^{PS}}\sum_k \left\|W_k - W^{PS}D_k W_k^D + \zeta\Lambda_k\right\|_F^2,$$

such that $$\left|\left[w_{p,q}^{PS}\right]_r\right| = 1, \forall p \in \mathcal{P}, q \in Q, r \in \mathcal{R}.$$

Example 19. The system of example 15, wherein while $\{W_k, z_{k,u}, \bar{z}_{k,e}, X, \ell, o, r_{k,u}, \bar{r}_{k,e,u}\}, \{\theta_t, \theta_r\}, W^{PS}$ and $D_k$ are kept fixed, $$W_k^D$$

is determined according to $$\min_{W_k^P, \forall k \in \mathcal{K}} \sum_k \left\| W_k - W^{PS} D_k W_k^D + \zeta \Lambda_k \right\|_F^2, \text{ and } W_k^D =$$

$$\left( \left( W_k^{PS} D_k \right)^H \left( W_k^{PS} D_k \right) \right)^{-1} \left( W_k^{PS} D_k \right)^H \times (W_k + \zeta \Lambda_k), \forall k \in \mathcal{K}.$$

Example 20. The system of example 15, wherein while $\{W_k, z_{k,u}, \bar{z}_{k,e}, X, \ell, o, r_{k,u}, \bar{r}_{k,e,u}\}, \{\theta_t, \theta_r\}, W^{PS}$ and $$W_k^D$$

are kept fixed, $D_k$ is determined according to $$\min_{D_k} \sum_k \left\| W_k - W^{PS} D_k W_k^D + \zeta \Lambda_k \right\|_F^2,$$

such that $d_{p,q} \geq 0, \forall p \in \mathcal{P}, q \in \mathcal{Q}$.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "target substrate" as used herein generically refers to an object being processed in accordance with the present disclosure. The substrate may include any material portion or structure of a device, particularly a semiconductor or other electronics device, and may, for example, be a base substrate structure, such as a semiconductor wafer, reticle, or a dielectric layer on or overlying a base substrate structure such as a thin film. Thus, substrate is not limited to any particular base structure, underlying dielectric layer or overlying dielectric layer, patterned or un-patterned, but rather, is contemplated to include any such dielectric layer or base structure, and any combination of dielectric layers and/or base structures. The description may reference particular types of substrates, but this is for illustrative purposes only.

Those skilled in the art will also understand that there can be many variations made to the operations of the techniques explained above while still achieving the same objectives of the present disclosure. Such variations are intended to be covered by the scope of this disclosure. As such, the foregoing descriptions of embodiments of the invention are not intended to be limiting. Rather, any limitations to embodiments of the invention are presented in the following claims.

The invention claimed is:

1. A method for maximizing a minimum secure energy efficiency in a near-field, wideband terahertz (THz) communication system, the method comprising:

generating, at a base station, a plurality of wideband THz signals using a hybrid analog-digital beamforming architecture that includes a plurality of radio-frequency (RF) chains, phase shifters (PS), and a plurality of true time delay (TTD) units;

applying, by the plurality of TTD units, respective time delays to compensate for beam-splitting effects across a plurality of subcarriers;

configuring, by a simultaneous transmitting and reflecting reconfigurable intelligent surface (STAR-RIS) comprising N elements, a set of phase-shifts and amplitude coefficients for each element of the STAR-RIS to simultaneously transmit and reflect the THz signals toward a plurality of user equipment (UEs) on a transmission side and a reflection side of the STAR-RIS;

determining, by a processor, a secrecy rate for each UE as a difference between an achievable rate of the UE and an intercept rate of an eavesdropper (EV); and optimizing, by the processor, a plurality of optimization variables including:

digital beamforming $$(W_k^D),$$

PS-based analog beamforming ($W^{PS}$), matrices of the TTD units ($D_k$), and transmission and reflection coefficients of the STAR-RIS ($\theta_t$ and $\theta_r$) to maximize a minimum secure energy efficiency among all UEs.

2. The method of claim 1, wherein the optimizing is performed subject to constraints including (i) a transmit-power budget, (ii) a unit-modulus constraint of the analog beamforming, (iii) an energy-conservation constraint at the STAR-RIS where a square of a transmission amplitude coefficient $$(\rho_{t,n}^2)$$

of plus a square of a reflection amplitude coefficient $$(\rho_{r,n}^2)$$

for each element equals one, and (iv) a non-negative time-delay constraint for the true-time-delay units.

3. The method of claim 2, wherein the optimizing is performed using a penalty dual decomposition (PDD) algorithm that constructs an augmented Lagrangian including dual variables and a penalty factor to enforce a plurality of equality constraints.

4. The method of claim 3, wherein the optimizing further comprises an inner loop that optimizes the augmented Lagrangian by block coordinate descent (BCD) and an outer loop that updates the dual variables and the penalty factor based on an equality constraint threshold.

5. The method of claim 4, wherein the BCD comprises iteratively updating the plurality of optimization variables, wherein, during each iteration, the processor fixes all but one optimization variable and updates the remaining optimization variables to minimize the augmented Lagrangian until convergence.

6. The method of claim 1, further comprising:

maximizing the minimum secure energy efficiency among all UEs by defining the secure energy-efficiency value for a UE is a ratio of a secrecy-rate of the UE to a total power consumption used to serve the UE.

7. The method of claim 1, wherein the secrecy rate is a non-negative difference between the achievable rate of the UE and a maximum achievable rate among a plurality of EVs when intercepting the user equipment.

8. The method of claim 1, further comprising:

operating the base station and the STAR-RIS in a wideband THz frequency range under near-field conditions.

9. The method of claim 1, further comprising:

applying the optimization variables obtained from the optimizing in real-time to control the base station and the STAR-RIS during wideband THz data transmission.

10. A system for maximizing a minimum secure energy efficiency in a near-field, wideband terahertz (THz) communication system, the system comprising:

a base station;

a simultaneous transmitting and reflecting reconfigurable intelligent surface (STAR-RIS) comprising N elements, and, a processor configured to:

generate, at a base station, a plurality of wideband THz signals using a hybrid analog-digital beamforming architecture that includes a plurality of radio-frequency (RF) chains, phase shifters (PS), and a plurality of the true time delay (TTD) units;

apply, via the plurality of TTD units, respective time delays to compensate for beam-splitting effects across a plurality of subcarriers;

configure, via the STAR-RIS, a set of phase-shifts and amplitude coefficients for each element of the STAR-RIS to simultaneously transmit and reflect the THz signals toward a plurality of user equipment (UEs) on a transmission side and a reflection side both-sides of the STAR-RIS;

determine, a secrecy rate for each UE as a difference between an achievable rate of the UE and an intercept rate of an eavesdropper (EV); and optimize a plurality of optimization variables including: digital beamforming $$\left(W_k^D\right),$$

PS-based analog beamforming (W$^{PS}$), matrices of the TTD units (D$_k$), and transmission and reflection coefficients of the STAR-RIS ($\theta_t$ and $\theta_r$) to maximize a minimum secure energy efficiency among all UEs.

11. The system of claim 10, wherein each RF chain of the plurality of RF chains is coupled to one or more TTD units, wherein outputs of the one or more TTD units are distributed via analog phase-shifters to a linear antenna array.

12. The system of claim 10, wherein the STAR-RIS comprises a uniform planar array (UPA) structure.

13. The system of claim 10, wherein the processor is further configured to optimize the plurality of optimization variables subject to constraints including (i) a transmit-power budget, (ii) a unit-modulus of the analog beamforming, (iii) an energy-conservation constraint at the STAR-RIS where a square of a transmission amplitude coefficient $$\left(\rho_{t,n}^2\right)$$

of plus a square of a reflection amplitude coefficient $$\left(\rho_{r,n}^2\right)$$

for each element equals one, and (iv) a non-negative time-delay constraint for the true-time-delay units.

14. The system of claim 13, wherein the processor is further configured to optimize the plurality of optimization variables using a penalty dual decomposition (PDD) algorithm that constructs an augmented Lagrangian including dual variables and a penalty factor to enforce a plurality of equality constraints.

15. The system of claim 14, wherein the optimizing further comprises an inner loop that optimizes the augmented Lagrangian by block coordinate descent (BCD) and an outer loop that updates the dual variables and the penalty factor based on an equality constraint violation threshold.

16. The system of claim 15, wherein the BCD comprises iteratively updating the plurality of optimization variables, wherein, during each iteration, the processor fixes all but one optimization variable and updates the remaining optimization variables to minimize the augmented Lagrangian until convergence.

17. The system of claim 10, wherein the processor is configured to maximize the minimum secure energy efficiency among all UEs by defining the secure energy-efficiency value for a UE is a ratio of a secrecy-rate of the UE to a total power consumption used to serve the UE.

18. The system of claim 10, wherein the secrecy rate is a non-negative difference between the achievable rate of the UE and a maximum achievable rate among a plurality of EVs when intercepting the user equipment.

19. The system of claim 10, wherein the processor is further configured to operate the base station and the STAR-RIS in a wideband THz frequency range under near-field conditions.

20. The system of claim 10, wherein the processor is further configured to apply the optimization variables obtained from the optimizing in real-time to control the base station and the STAR-RIS during wideband THz data transmission.

* * * * *